(12) United States Patent
Cho et al.

(10) Patent No.: US 8,363,019 B2
(45) Date of Patent: Jan. 29, 2013

(54) MOBILE TERMINAL USING PROXIMITY SENSOR AND METHOD OF CONTROLLING THE MOBILE TERMINAL

(75) Inventors: Hyun A Cho, Seoul (KR); Jue Byung Yun, Seoul (KR); Seon Hwi Cho, Seoul (KR)

(73) Assignee: LG Electronics Inc., Seoul (KR)

(*) Notice: Subject to any disclaimer, the term of this patent is extended or adjusted under 35 U.S.C. 154(b) by 623 days.

(21) Appl. No.: 12/469,410

(22) Filed: May 20, 2009

(65) Prior Publication Data

US 2009/0303199 A1  Dec. 10, 2009

(30) Foreign Application Priority Data

May 26, 2008  (KR) .................... 10-2008-0048785
May 26, 2008  (KR) .................... 10-2008-0048786
Jun. 5, 2008  (KR) .................... 10-2008-0053232

(51) Int. Cl.
*G06F 3/041* (2006.01)
(52) U.S. Cl. ............. 345/173; 715/204; 345/179
(58) Field of Classification Search ........... 345/173; 715/204
See application file for complete search history.

(56) References Cited

U.S. PATENT DOCUMENTS

| | | | | |
|---|---|---|---|---|
| 6,226,000 B1 * | 5/2001 | Richens et al. | ............... | 345/419 |
| 6,339,429 B1 * | 1/2002 | Schug | ............... | 345/589 |
| 6,518,978 B1 * | 2/2003 | Omata et al. | ............... | 715/723 |
| 7,310,534 B2 * | 12/2007 | Northcutt | ............... | 455/456.6 |
| 2003/0114137 A1 * | 6/2003 | Eiden et al. | ............... | 455/403 |
| 2009/0070820 A1 * | 3/2009 | Li | ............... | 725/62 |

FOREIGN PATENT DOCUMENTS

| | | |
|---|---|---|
| EP | 445-906 A1 | 9/1991 |
| EP | 1-785-818 A2 | 5/2007 |
| WO | WO-03/012618 A2 | 2/2003 |
| WO | WO-2006/003586 A2 | 1/2006 |
| WO | WO-2006/003588 A2 | 1/2006 |
| WO | WO 2006003588 A2 * | 1/2006 |

* cited by examiner

*Primary Examiner* — Amare Mengistu
*Assistant Examiner* — Shawna Stepp Jones
(74) *Attorney, Agent, or Firm* — Birch, Stewart, Kolasch & Birch, LLP

(57) ABSTRACT

A mobile terminal including a touch screen and a proximity sensor and a method of controlling the mobile terminal are provided. The method includes displaying an image on the touch screen; if a touch signal for the image is received, displaying an image-editing menu; choosing one of a plurality of image-editing functions from the image-editing menu; and selecting a 'detailed settings' mode for the chosen image-editing function in response to a proximity signal output by the proximity sensor and performing the chosen image-editing function on the image. Accordingly, it is possible to perform various image-editing control operations using the proximity sensor.

15 Claims, 32 Drawing Sheets

(a)   (b)

FIG. 29
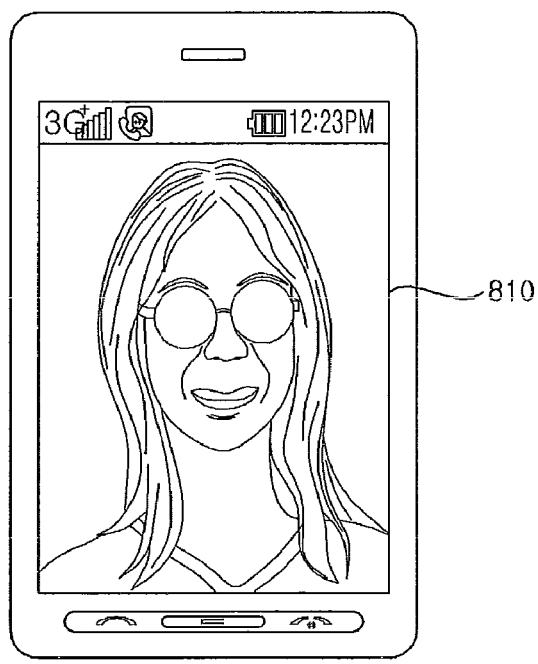
(a)
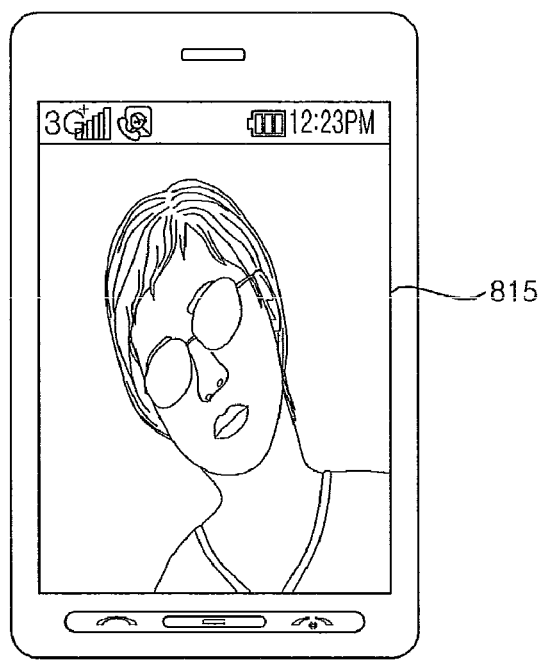
(b)

MOBILE TERMINAL USING PROXIMITY SENSOR AND METHOD OF CONTROLLING THE MOBILE TERMINAL

CROSS-REFERENCE TO RELATED APPLICATION

This application claims the priority benefit of Korean Patent Application Nos. 10-2008-0048785, 10-2008-0048786, and 10-2008-0053232, filed on May 26, 2008, May 26, 2008, and Jun. 5, 2008, respectively, in the Korean Intellectual Property Office, the disclosures of which are incorporated herein by reference.

BACKGROUND OF THE INVENTION

1. Field of the Invention

The present invention relates to a mobile terminal and a method of controlling the mobile terminal, and more particularly, to a mobile terminal using a proximity sensor and a method of controlling the mobile terminal in which various image-editing operations can be effectively controlled using the proximity sensor.

2. Description of the Related Art

Mobile terminals are portable devices, which can provide users with various services such as a voice calling service, a video calling service, an information input/output service, and a data storage service.

As the types of services provided by mobile terminals diversify, an increasing number of mobile terminals have been equipped with various complicated functions such as capturing photos or moving pictures, playing music files or moving image files, providing game programs, receiving broadcast programs and providing wireless internet services and have thus evolved into multimedia players.

Various attempts have been made to realize such complicated functions as hardware devices or software programs. For example, various user interface (UI) environments, in which users are allowed to easily search for and choose desired functions, have been developed. In addition, the demand for various designs for mobile terminals such as a double-sided liquid crystal display (LCD) or a full touch screen has steadily grown due to a growing tendency of considering mobile terminals as personal items that can represent personal individuality.

However, there is a restriction in allocating sufficient space for a UI (such as a display device or a keypad) of a mobile terminal without compromising the mobility and the portability of a mobile terminal. Therefore, in order to efficiently use various functions provided by a mobile terminal, it is necessary to develop new data input methods that can replace existing complicated menu-based data input methods and thus to effectively control the operation of a mobile terminal.

SUMMARY OF THE INVENTION

The present invention provides a mobile terminal using a proximity sensor and a method of controlling the mobile terminal in which various image-editing operations can be effectively controlled using the proximity sensor.

The present invention also provides a mobile terminal using a proximity sensor and a method of controlling the mobile terminal in which various operations can be effectively controlled using the proximity sensor and vibration signals.

According to an aspect of the present invention, there is provided a method of controlling a mobile terminal including a touch screen and a proximity sensor, the method including displaying an image on the touch screen; if a touch signal for the image is received, displaying an image-editing menu; choosing one of a plurality of image-editing functions from the image-editing menu; and selecting a 'detailed settings' mode for the chosen image-editing function in response to a proximity signal output by the proximity sensor and performing the chosen image-editing function on the image.

According to another aspect of the present invention, there is provided a mobile terminal including a touch screen configured to display an image; a proximity sensor configured to output a proximity signal indicating a degree of proximity of an object detected to be nearby and approaching the touch screen and a proximity position of the object; and a controller configured to display an image-editing menu if a touch signal for the image is received, choose one of a plurality of image-editing functions from the image-editing menu, select a 'detailed settings' mode for the chosen image-editing function in response to the proximity signal and control the chosen image-editing function to be performed on the image.

According to another aspect of the present invention, there is provided a computer-readable recording medium having recorded thereon a program for executing a method of controlling a mobile terminal including a touch screen and a proximity sensor, the method including displaying an image on the touch screen; if a touch signal for the image is received, displaying an image-editing menu; choosing one of a plurality of image-editing functions from the image-editing menu; and selecting a 'detailed settings' mode for the chosen image-editing function in response to a proximity signal output by the proximity sensor and performing the chosen image-editing function on the image.

BRIEF DESCRIPTION OF THE DRAWINGS

The above and other features and advantages of the present invention will become more apparent by describing in detail preferred embodiments thereof with reference to the attached drawings in which:

FIGS. 28 through 33 illustrate diagrams of various screens for explaining the method of the third exemplary embodiment;

DETAILED DESCRIPTION OF THE INVENTION

The present invention will hereinafter be described in detail with reference to the accompanying drawings in which exemplary embodiments of the invention are shown.

The term 'mobile terminal', as used herein, may indicate a mobile phone, a smart phone, a laptop computer, a digital broadcast receiver, a personal digital assistant (PDA), a portable multimedia player (PMP), or a navigation device.

Figure 1:
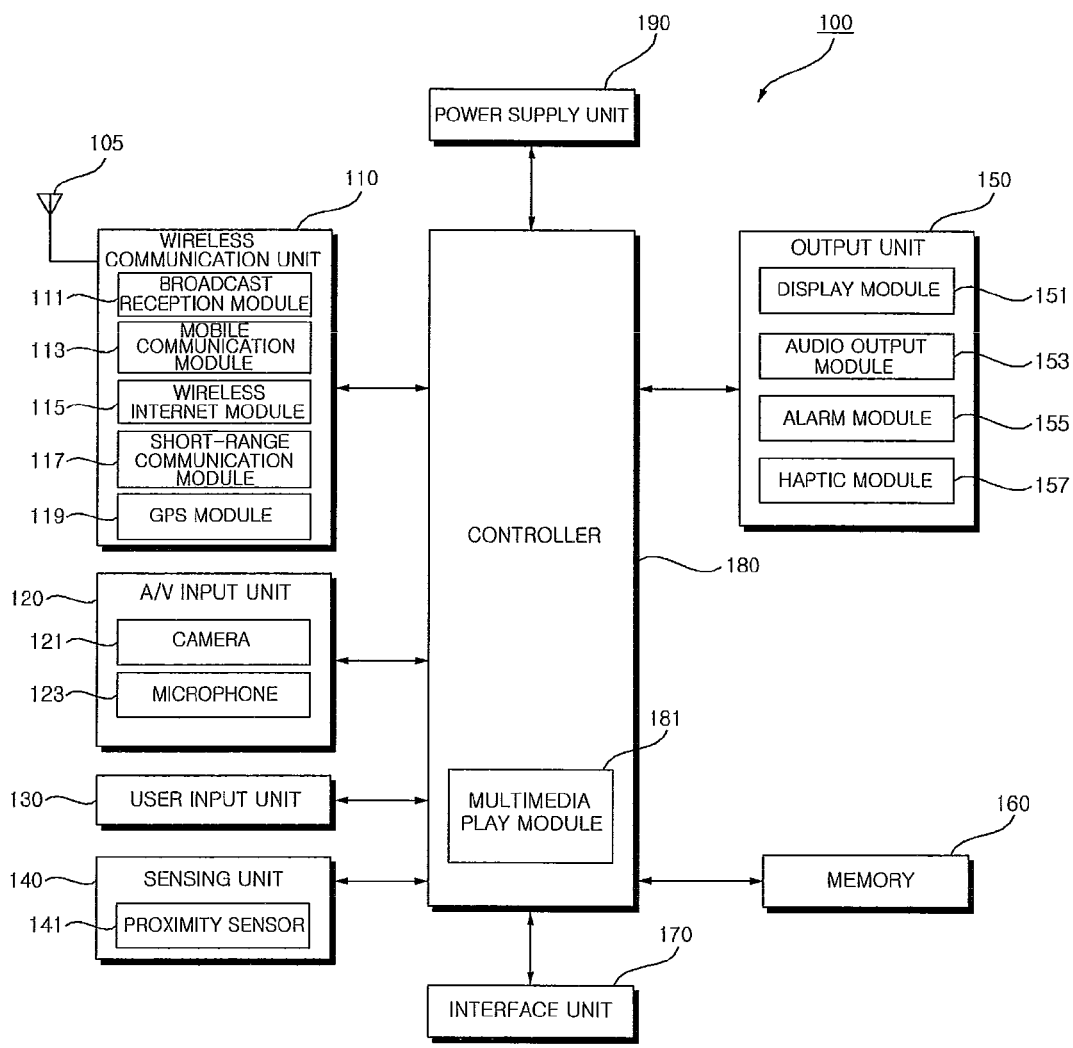
FIG. 1 illustrates a block diagram of a mobile terminal according to an exemplary embodiment of the present invention.

FIG. 1 illustrates a block diagram of a mobile terminal 100 according to an embodiment of the present invention. Referring to FIG. 1, the mobile terminal 100 may include a wireless communication unit 110, an audio/video (A/V) input unit 120, a user input unit 130, a sensing unit 140, an output unit 150, a memory 160, an interface unit 170, a controller 180, and a power supply unit 190. Two or more of the wireless communication unit 110, the A/V input unit 120, the user input unit 130, the sensing unit 140, the output unit 150, the memory 160, the interface unit 170, the controller 180, and the power supply unit 190 may be incorporated into a single unit, or some of the wireless communication unit 110, the A/V input unit 120, the user input unit 130, the sensing unit 140, the output unit 150, the memory 160, the interface unit 170, the controller 180, and the power supply unit 190 may be divided into two or more smaller units.

The wireless communication unit 110 may include a broadcast reception module 111, a mobile communication module 113, a wireless internet module 115, a short-range communication module 117, and a global positioning system (GPS) module 119.

The broadcast reception module 111 may receive a broadcast signal and/or broadcast-related information from an external broadcast management server through a broadcast channel. The broadcast channel may be a satellite channel or a terrestrial channel. The broadcast management server may be a server which generates broadcast signals and/or broadcast-related information and transmits the generated broadcast signals and/or the generated broadcast-related information or may be a server which receives and then transmits previously-generated broadcast signals and/or previously-generated broadcast-related information.

The broadcast-related information may include broadcast channel information, broadcast program information and/or broadcast service provider information. The broadcast signal may be a TV broadcast signal, a radio broadcast signal, a data broadcast signal, the combination of a data broadcast signal and a TV broadcast signal or the combination of a data broadcast signal and a radio broadcast signal. The broadcast-related information may be provided to the mobile terminal 100 through a mobile communication network. In this case, the broadcast-related information may be received by the mobile communication module 113, rather than by the broadcast reception module 111. The broadcast-related information may come in various forms. For example, the broadcast-related information may be electronic program guide (EPG) of digital multimedia broadcasting (DMB) or may be electronic service guide (ESOG) of digital video broadcast-handheld (DVB-H).

The broadcast reception module 111 may receive the broadcast signal using various broadcasting systems such as digital multimedia broadcasting-terrestrial (DMB-T), digital multimedia broadcasting-satellite (DMB-S), media forward link only (MediaFLO), DVB-H, and integrated services digital broadcast-terrestrial (ISDB-T). In addition, the broadcast reception module 111 may be configured to be suitable for nearly all types of broadcasting systems other than those set forth herein. The broadcast signal and/or the broadcast-related information received by the broadcast reception module 111 may be stored in the memory 160.

The mobile communication module 113 may transmit wireless signals to or receives wireless signals from at least one of a base station, an external terminal, and a server through a mobile communication network. The wireless signals may include various types of data according to whether the mobile terminal 100 transmits/receives voice call signals, video call signals, or text/multimedia messages.

The wireless internet module 115 may be a module for wirelessly accessing the internet. The wireless internet module 115 may be embedded in the mobile terminal 100 or may be installed in an external device.

The short-range communication module 117 may be a module for short-range communication. The short-range communication module 117 may use various short-range communication techniques such as Bluetooth, radio frequency identification (RFID), infrared data association (IrDA), ultra wideband (UWB), and ZigBee.

The GPS module 119 may receive position information from a plurality of GPS satellites.

The A/V input unit 120 may be used to receive audio signals or video signals. The A/V input unit 120 may include a camera 121 and a microphone 123. The camera 121 may process various image frames such as still images or moving images captured by an image sensor during a video call mode or an image capturing mode. The image frames processed by the camera 121 may be displayed by a display module 151.

The image frames processed by the camera 121 may be stored in the memory 160 or may be transmitted to an external device through the wireless communication unit 110. The mobile terminal 100 may include two or more cameras 121.

The microphone 123 may receive external sound signals during a call mode, a recording mode, or a voice recognition mode with the use of a microphone and may convert the sound signals into electrical sound data. In the call mode, the mobile communication module 113 may convert the electrical sound data into data that can be readily transmitted to a mobile communication base station and then output the data obtained by the conversion. The microphone 123 may use various noise removal algorithms to remove noise that may be generated during the reception of external sound signals.

The user input unit 130 may generate key input data based on user input for controlling the operation of the mobile terminal 100. The user input unit 130 may be implemented as a keypad, a dome switch, a touch pad (static pressure/static voltage), a jog wheel, or a jog switch. In particular, if the user input unit 130 is implemented as a touch pad and forms a layer structure together with the display module 151, the user input unit 130 and the display module 151 may be collectively referred to as a touch screen.

The sensing unit 140 determines a current state of the mobile terminal 100 such as whether the mobile terminal 100 is opened up or closed, the position of the mobile terminal 100 and whether the mobile terminal 100 is placed in contact with a user, and generates a sensing signal for controlling the operation of the mobile terminal 100. For example, when the mobile terminal 100 is a slider-type mobile phone, the sensing unit 140 may determine whether the mobile terminal 100 is opened up or closed. In addition, the sensing unit 140 may determine whether the mobile terminal 100 is powered by the power supply unit 190 and whether the interface unit 170 is connected to an external device.

The sensing unit 140 may include a proximity sensor 141. The proximity sensor 141 may determine whether there is an object nearby and approaching the mobile terminal 100 without any mechanical contact with the entity. More specifically, the proximity sensor 141 may detect an object that is nearby and approaching by detecting a change in an alternating magnetic field or the rate of change of static capacitance. The sensing unit 140 may include two or more proximity sensors 141.

The output unit 150 may output audio signals, video signals and alarm signals. The output unit 150 may include the display module 151, an audio output module 153, an alarm module 155, and a haptic module 157.

The display module 151 may display various information processed by the mobile terminal 100. For example, if the mobile terminal 100 is in a call mode, the display module 151 may display a user interface (UI) or a graphic user interface (GUI) for making or receiving a call. If the mobile terminal 100 is in a video call mode or an image capturing mode, the display module 151 may display a UI or a GUI for capturing or receiving images.

If the display module 151 and the user input unit 130 form a layer structure together and are thus implemented as a touch screen, the display module 151 may be used as both an output device and an input device. If the display module 151 is implemented as a touch screen, the display module 151 may also include a touch screen panel and a touch screen panel controller. The touch screen panel is a transparent panel attached onto the exterior of the mobile terminal 100 and may be connected to an internal bus of the mobile terminal 100. The touch screen panel keeps monitoring whether the touch screen panel is being touched by the user. Once a touch input to the touch screen panel is detected, the touch screen panel transmits a number of signal. corresponding to the touch input to the touch screen panel controller. The touch screen panel controller processes the signals transmitted by the touch screen panel, and transmits the processed signals to the controller 180. Then, the controller 180 determines whether a touch input has been generated and which part of the touch screen panel has been touched based on the processed signals transmitted by the touch screen panel controller.

The display module 151 may include at least one of a liquid crystal display (LCD), a thin film transistor (TFT)-LCD, an organic light-emitting diode (OLED), a flexible display, and a three-dimensional (3D) display. The mobile terminal 100 may include two or more display modules 151. For example, the mobile terminal 100 may include an external display module (not shown) and an internal display module (not shown).

The audio output module 153 may output audio data received by the wireless communication unit 110 during a call reception mode, a call mode, a recording mode, a voice recognition mode, or a broadcast reception mode or may output audio data present in the memory 160. In addition, the audio output module 153 may output various sound signals associated with the functions of the mobile terminal 100 such as receiving a call or a message. The audio output module 153 may include a speaker and a buzzer.

The alarm module 155 may output an alarm signal indicating the occurrence of an event in the mobile terminal 100. Examples of the event include receiving a call signal, receiving a message, and receiving a key signal. Examples of the alarm signal output by the alarm module 155 include an audio signal, a video signal and a vibration signal. More specifically, the alarm module 155 may output vibration upon receiving a call signal or a message. In addition, the alarm module 155 may receive a key signal and may output vibration as feedback to the key signal. Therefore, the user may be able to easily recognize the occurrence of an event based on vibration output by the alarm module 155. An alarm signal for notifying the user of the occurrence of an event may be output not only by the alarm module 155 but also by the display module 151 or the audio output module 153.

The haptic module 157 may provide various haptic effects (such as vibrations) that can be perceived by the user. If the haptic module 157 generates vibration as a haptic effect, the intensity and the pattern of vibration generated by the haptic module 157 may be altered in various manners. The haptic module 157 may synthesize different vibration effects and may output the result of the synthesization. Alternatively, the haptic module 157 may sequentially output different vibration effects.

The haptic module 157 may provide various haptic effects, other than vibration, such as a haptic effect obtained using a pin array that moves perpendicularly to a contact skin surface, a haptic effect obtained by injecting or sucking in air through an injection hole or a suction hole, a haptic effect obtained by giving a stimulus to the surface of the skin, a haptic effect obtained through contact with an electrode, a haptic effect obtained using an electrostatic force, and a haptic effect obtained by realizing the sense of heat or cold using a device capable of absorbing heat or generating heat. The haptic module 157 may be configured to enable the user to recognize a haptic effect using the kinesthetic sense of the fingers or the arms. The mobile terminal 100 may include two or more haptic modules 157.

The memory 160 may store various programs necessary for the operation of the controller 180. In addition, the memory 160 may temporarily store various data such as a phonebook, messages, still images, or moving images.

The memory 160 may include at least one of a flash memory type storage medium, a hard disk type storage medium, a multimedia card micro type storage medium, a card type memory (e.g., a secure digital (SD) or extreme digital (XD) memory), a random access memory (RAM), and a read-only memory (ROM). The mobile terminal 100 may operate a web storage, which performs the functions of the memory 160 on the internet.

The interface unit 170 may interface with an external device that can be connected to the mobile terminal 100. The interface unit 170 may be a wired/wireless headset, an external battery charger, a wired/wireless data port, a card socket for, for example, a memory card, a subscriber identification module (SIM) card or a user identity module (UIM) card, an audio input/output (I/O) terminal, a video I/O terminal, or an earphone. The interface unit 170 may receive data from an external device or may be powered by an external device. The interface unit 170 may transmit data provided by an external device to other components in the mobile terminal 100 or may transmit data provided by other components in the mobile terminal 100 to an external device.

The controller 180 may control the general operation of the mobile terminal 100. For example, the controller 180 may perform various control operations regarding making/receiving a voice call, transmitting/receiving data, or making/receiving a video call. The controller 180 may include a multimedia play module 181, which plays multimedia data. The multimedia play module 181 may be implemented as a hardware device and may be installed in the controller 180. Alternatively, the multimedia play module 181 may be implemented as a software program.

The power supply unit 190 may be supplied with power by an external power source or an internal power source and may supply power to the other components in the mobile terminal 100.

The exterior of the mobile terminal 100 will hereinafter be described in detail with reference to FIGS. 2 and 3. For convenience, assume that the mobile terminal 100 is a slider-type mobile terminal equipped with a full touch screen. However, the present invention is not restricted to a slider-type mobile terminal equipped with a full touch screen. Rather, the present invention can be applied to various mobile phones, other than a slider-type mobile terminal.

Figure 2:
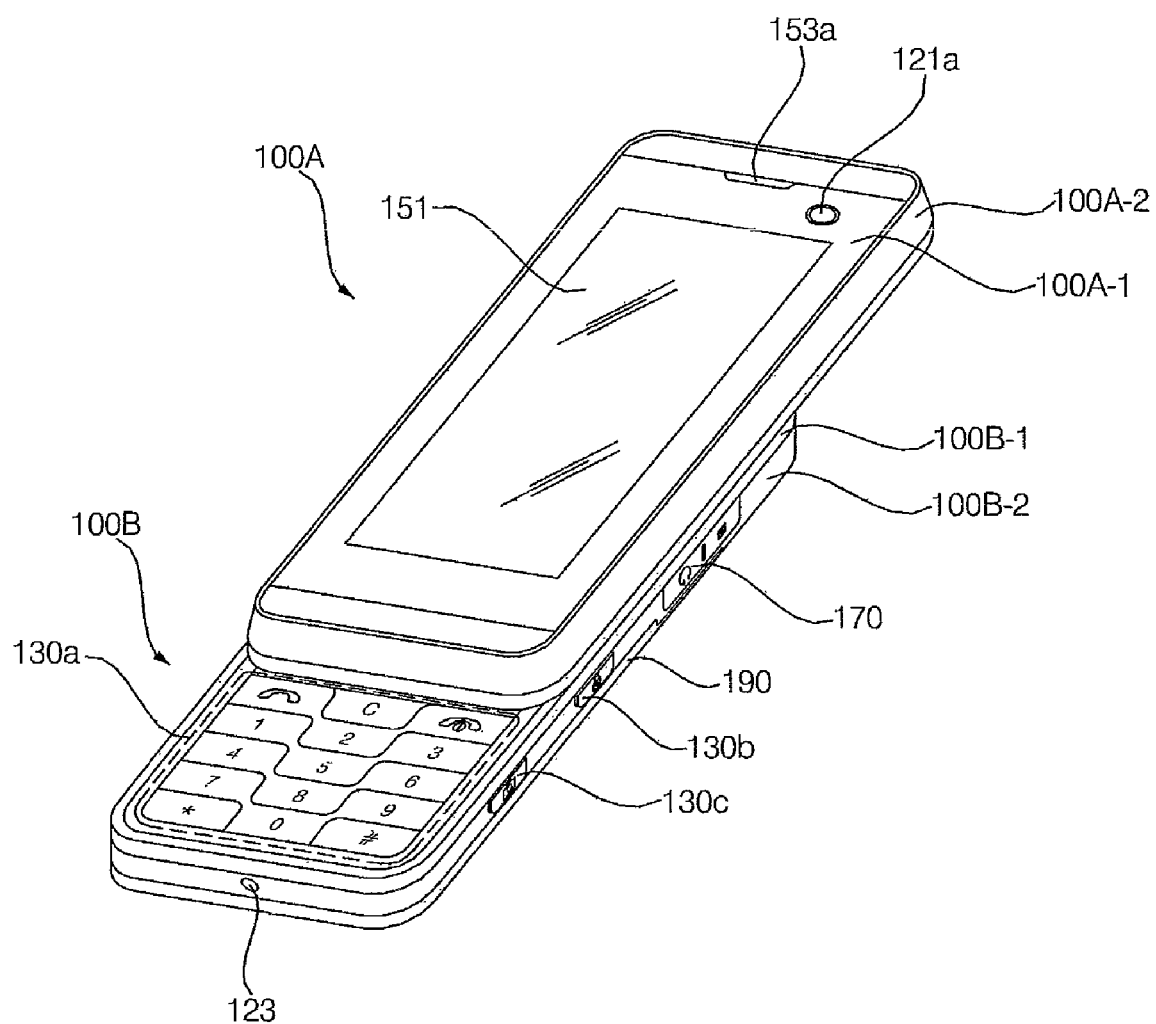
FIG. 2 illustrates a front perspective view of the mobile terminal shown in FIG. 1.

FIG. 2 illustrates a front perspective view of the mobile terminal 100 shown in FIG. 1. Referring to FIG. 2, the mobile terminal 100 may include a first body 100A and a second body 100B. The first and second bodies 100A and 100B may be configured to be able to slide up and down on each other.

When the mobile terminal 100 is closed, the first body 100A and the second body 100B overlap each other. On the other hand, referring to FIG. 2, when the mobile terminal 100 is open, the second body 100B may be at least partially exposed below the first body 100A.

When the mobile terminal 100 is closed, the mobile terminal may generally operate in a standby mode and may be released from the standby mode in response to user manipulation. On the other hand, when the mobile terminal 100 is open, the mobile terminal 100 may generally operate in a call mode and may be switched to the standby mode either manually in response to user manipulation or automatically after the lapse of a predefined amount of time.

The exterior of the first body 100A may be defined by a first front case 100A-1 and a first rear case 100A-2. Various electronic devices may be installed in the space formed by the first front case 100A-1 and the first rear case 100A-2. At least one intermediate case may be additionally provided between the first front case 100A-1 and the first rear case 100A-2. The first front case 100A-1 and the rear case 100A-2 may be formed of a synthetic resin through injection molding. Alternatively, the first front case 100A-1 and the rear case 100A-2 may be formed of a metal such as stainless steel (STS) or titanium (Ti).

The display module 151, a first audio output module 153a, and a first camera 121a may be disposed in the first front case 100A-1.

Examples of the display module 151 include an LCD and an OLED which can visualize information. Since a touch pad is configured to overlap the display module 151 and thus to form a layer structure, the display module 151 may serve as a touch screen. Thus, it is possible to input various information to the mobile terminal 100 simply by touching the display module 151.

The first audio output module 153a may be implemented as a receiver or a speaker. The first camera 121a may be configured to capture a still image or a moving image of the user.

The exterior of the second body 100 may be defined by a second front case 100B-1 and a second rear case 100B-2. A first user input unit 130a may be disposed at the front of the second front case 100B-1. Second and third user input units 130b and 130c, the microphone 123 and the interface unit 170 may be disposed in the second front case 100B-1 or the second rear case 100B-2.

The first through third user input units 130a through 130c may be collectively referred to as the user input unit 130. The user input unit 130 may adopt various manipulation methods as long as it can offer tactile feedback to the user.

For example, the user input unit 130 may be implemented as a dome switch or a touch pad which receives a command or information upon being pushed or touched by the user. Alternatively, the user input unit 130 may be implemented as a wheel, a jog dial, or a joystick.

The first user input unit 130a may allow the user to input commands (such as 'start', 'end', and 'scroll'), numerals, characters and/or symbols, and the second and third user input units 130b and 130c may be used as hot keys for activating certain functions of the mobile terminal 100.

The microphone 123 may be configured to properly receive the voice of the user or other sounds. The interface unit 170 may serve as a path for allowing the mobile terminal 100 to exchange data with an external device. For example, the interface unit 170 may be a connection terminal for connecting an earphone to the mobile terminal 100 in a wired or wireless manner, a port for short-range communication or a power supply terminal for supplying operating power to the mobile terminal 100. The interface unit 170 may be a SIM or a UIM or may be a card socket for an exterior-type card such as a memory card for storing data.

The power supply unit 190 supplying power to the mobile terminal 100 may be installed in the second rear case 100B-2. The power supply unit 190 may be a rechargeable battery and may be coupled to the second body 100B so as to be attachable to or detachable from the second body 100B.

Figure 3:
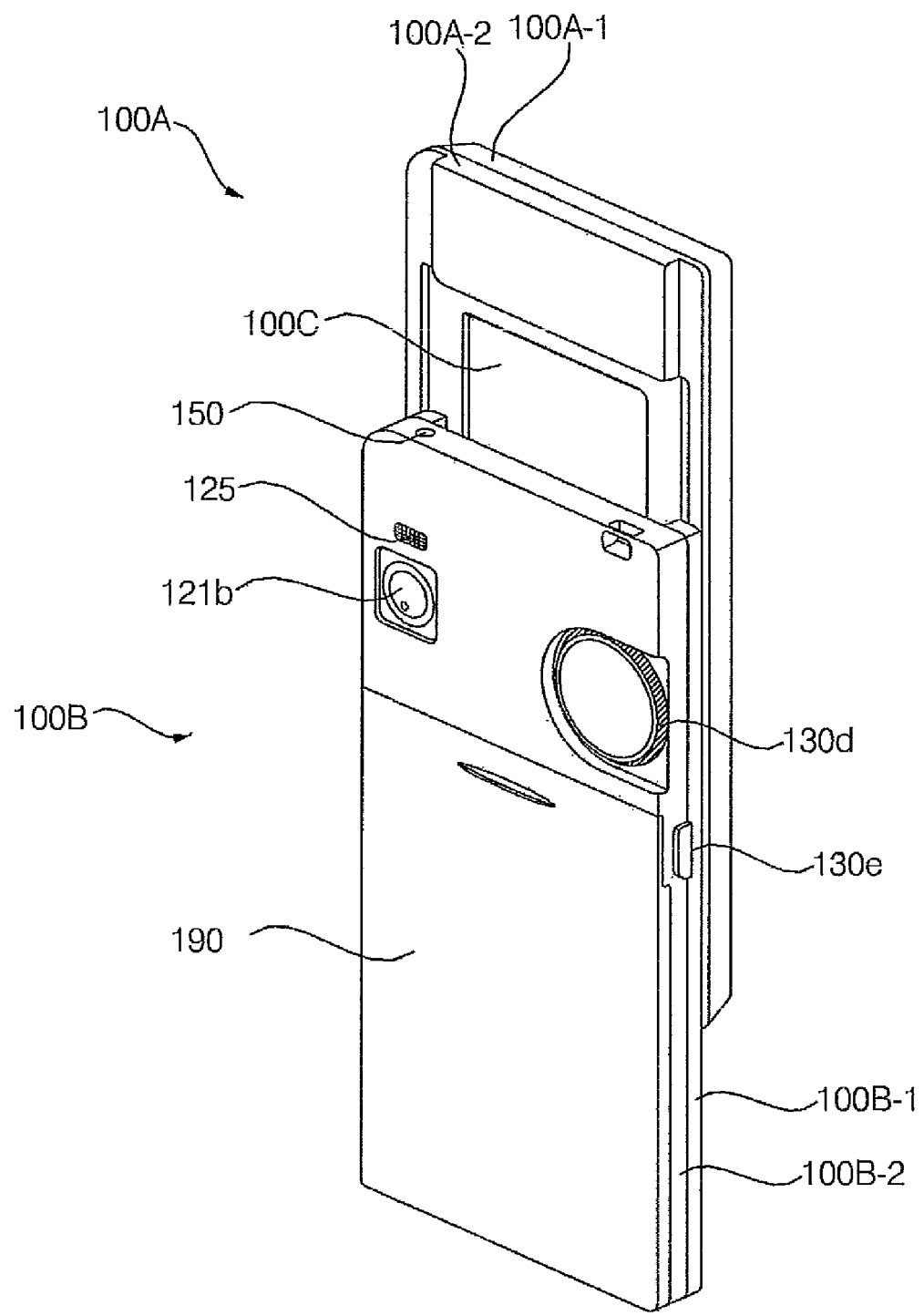
FIG. 3 illustrates a rear perspective view of the mobile terminal shown in FIG. 1.

FIG. 3 illustrates a rear perspective view of the mobile terminal 100 shown in FIG. 2. Referring to FIG. 3, a fourth user input unit 130d and a second camera 121b may be disposed at the rear of the second rear case 100B-2 of the second body 100B. The fourth user input unit 130d may be of a wheel type. A fifth user input unit 130e may be disposed on one side of the second body 100B.

The second camera 121b may have a different photographing direction from that of the first camera 121a shown in FIG. 2. In addition, the first and second cameras 121a and 121b may have different resolutions. For example, the first camera 121a may be used to capture and then transmit an image of the face of the user during a video call. Thus, a low-resolution camera may be used as the first camera 121a. The second camera 121b may be used to capture an image of an ordinary subject. In this case, the image captured by the second camera 121b may not need to be transmitted. Thus, a high-resolution camera may be used as the second camera 121b.

A camera flash 125 and a mirror may be disposed near the second camera 121b. The camera flash 125 may illuminate a subject when the second camera 121b captures an image of the subject. The user may look in the mirror and prepare himself or herself for taking a self shot.

A second audio output module (not shown) may be additionally provided in the second rear case 100B-2. The second audio output module may realize a stereo function along with the first audio output module 153a. The second audio output module may also be used during a speaker-phone mode.

An antenna (not shown) for receiving a broadcast signal may be disposed on one side of the second rear case 100B-2.

The antenna may be installed so as to be able to be pulled out of the second rear case 100B-2. A slide module may be disposed between the first body 100A and the second body 100B and may couple the first body 100A and the second body 100B so as to be able to slide up and down on each other. Referring to FIG. 3, when the mobile terminal 100 is open, part of the slide module may be exposed on the first rear case 100A-2 of the first body, and the rest of the slide module may be hidden by the second front case 100B-1 of the second body 100B.

The second camera 121b and the fourth and fifth user input units 130d and 130e are illustrated in FIG. 3 as being provided on the second body 100B, but the present invention is not restricted to this. For example, at least one of the second camera 121b and the fourth and fifth user input units 130d and 130e may be mounted on the first body 100A, and particularly, the first rear case 100A-2. In this case, whichever of the second camera 121b and the fourth and fifth user input units 130d and 130e are mounted on the first rear case 100A-2 may be protected by the second body 100B.

In addition, the first camera 121a may be configured to be rotatable and thus to cover the photographing direction of the second camera 121b. In this case, the second camera 121b may be optional.

The power supply unit 190 may be disposed in the first rear case 100A-2. The power supply unit may be a rechargeable battery and may be coupled to the first rear case 100A-2 so as to be attachable to or detachable from the first rear case 100A-2.

Figure 4:
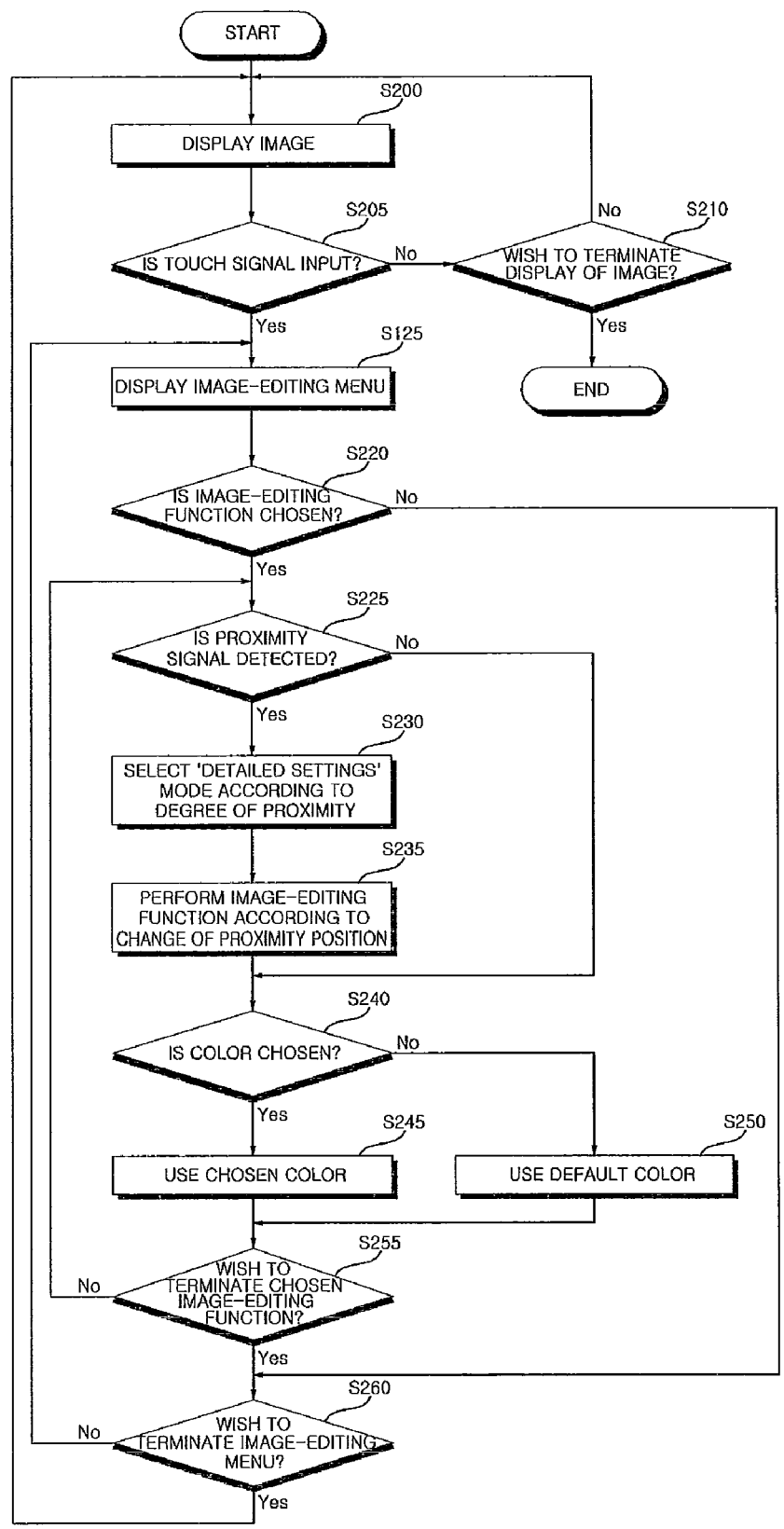
FIG. 4 illustrates a flowchart of a method of controlling a mobile terminal according to a first exemplary embodiment of the present invention.

FIG. 4 illustrates a flowchart of a method of controlling a mobile terminal according to a first exemplary embodiment of the present invention. Referring to FIG. 4, if a menu involving the display of images such as an album menu is executed and an image to be displayed is chosen, the controller 180 may control the chosen image to be displayed on the display module 151 (S200).

Thereafter, if a touch signal for the chosen image is received (S205), the controller 180 may control an image-editing menu to be displayed (S215). The image-editing menu may be displayed at the top or bottom of or on the left or right side of the chosen image. The display of the chosen image may continue until the user chooses to terminate the display of the chosen image (S210).

If an image-editing function is chosen from the image-editing menu in response to a touch input (S220), the controller 180 may determine whether the proximity sensor 141 has output a proximity signal (S205). The image-editing menu may include various editing functions such as drawing, painting, erasing, additional image-editing (e.g., lens correction, text insertion and font setting) and selecting.

If an object (such as the user's finger) is detected to be nearby and approaching the display module 151 when one of the image-editing functions of the image-editing menu is chosen, the controller 180 may control a 'detailed settings' mode regarding the chosen image-editing function to be selected according to the degree to which the detected object is close to the display module 151 (S230). Thereafter, the controller 180 may control the chosen image-editing function to be executed according to the movement of the detected object (S235).

For example, if the chosen image-editing function is a 'draw lines' function, the chosen image-editing function may provide various settings regarding the style of lines. Accordingly, the style of lines may be determined according to the degree to which the detected object is close to the display module 151, and then lines may be drawn according to the results of the determination and the movement of the detected object.

If the chosen image-editing function is a 'paintbrush' function, the size of a paintbrush may be chosen according to the degree to which the detected object is close to the display module 151, and the chosen image may be painted over by the paintbrush according to the movement of the detected object. If the chosen image-editing function is an 'eraser' function, the size of an erasure may be chosen according to the degree to which the detected object is close to the display module 151, and the chosen image may be erased by the erasure according to the movement of the detected object. If the chosen image-editing function is a 'select region' finction, a selection size may be selected according to the degree to which the detected object is close to the display module 151, and part of the chosen image with the selected selection size may be selected in response to a touch signal or another selection signal.

If a color is chosen (S240), the controller 180 may control the chosen color to be used in the editing of the chosen image (S245). Otherwise, the controller 180 may control a default color or a previously-chosen color to be used in the editing of the chosen image (S250).

Operations S225 through S250 may be repeatedly performed until the user chooses to terminate the chosen image-editing function (S255). If the user chooses to terminate the chosen image-editing function (S255), the controller 180 may determine whether the editing of the chosen image is complete (S260). If it is determined in operation S260 that the editing of the chosen image is completed, the method returns to operation S200. On the other hand, if it is determined in operation S260 that the editing of the chosen image is yet to be completed, the method returns to operation S215. Once the chosen image is edited, the user may choose whether to store the edited image in the memory 160.

In this manner, when an image-editing menu is displayed and an image-editing function is chosen in response to the detection of an object (such as the user's finger) nearby and approaching the display module 151, it is possible to select a 'detailed settings' mode regarding the chosen image-editing function and then to execute the chosen image-editing function upon the movement of the user's finger. In addition, if an area outside the image-editing menu is touched or if no proximity signal is detected for more than a predefined amount of time, it is possible to make the image-editing menu disappear from the display module 151.

The selection of a 'detailed settings' mode for an image-editing function and the execution of the image-editing function may be performed either simultaneously or sequentially. For example, if the user's finger moves over an image displayed on the display module 151 when a current image-editing function is a 'draw lines' function, the style of lines may vary according to the degree to which the user's finger is close to the image. If the user's finger approaches a portion of the display module 151 where the image is not displayed, a menu for selecting a 'detailed settings' mode may be displayed, and thus, the user may be allowed to select the 'detailed settings' mode. Thereafter, if the user's finger approaches the image, the current image-editing function may be executed.

In order to perform complex operations, a touch signal and a proximity signal may be used together. For example, if a current image-editing function is a 'draw lines' function, a line may be drawn from one point in an image being touched to another point in the image being touched according to the movement of a proximity position from which a proximity signal is detected.

An indicator icon indicating the detection of a proximity signal and the degree of proximity may be displayed on the display module 151. Alternatively, in order to indicate the detection of a proximity signal and the degree of proximity, a certain key signal may be output, or a light may be turned on or off. In addition, an icon indicating a point in an image currently being edited may be displayed over the image.

Figure 5:
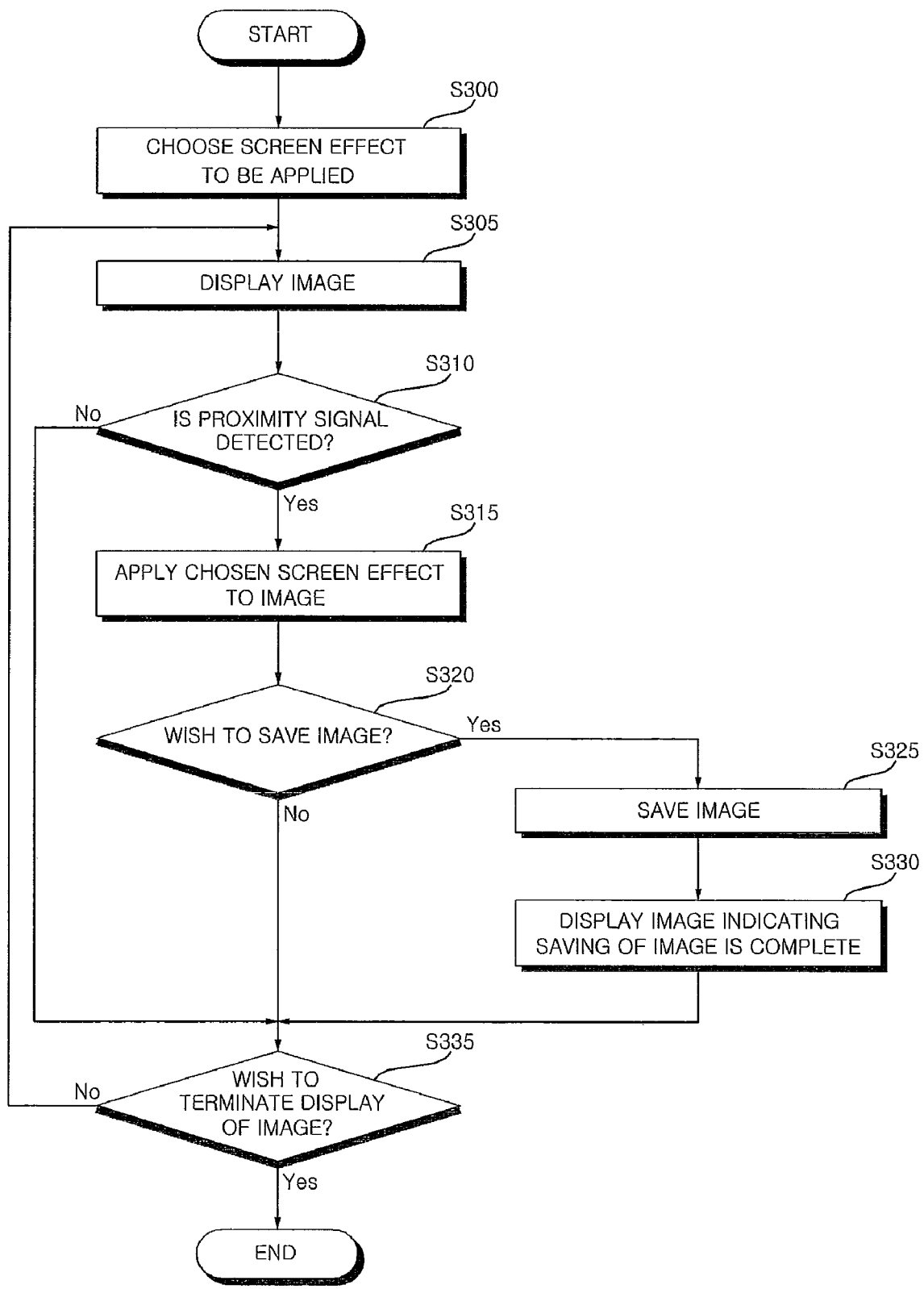
FIG. 5 illustrates a flowchart of a method of controlling a mobile terminal according to a second exemplary embodiment of the present invention.

FIG. 5 illustrates a flowchart of a method of controlling a mobile terminal according to a second exemplary embodiment of the present invention. In the second exemplary embodiment, various screen effects may be applied to an image displayed on the display module 151 in response to a proximity signal detected by the proximity sensor 141.

Referring to FIG. 5, if a proximity signal is detected, the controller 180 may choose one of a plurality of screen effects that can be applied to an image currently being displayed on the display module 151 (S300). The screen effects may include a 'noise' effect, a 'render' effect, a 'brush strokes' effect, a 'video' effect, a 'sharp' effect, a 'sketch' effect, a 'stylize' effect, an 'artistic' effect, a 'distort' effect, a 'texture' effect, a 'pixelate' effect, and a 'blur' effect. A menu for choosing one of the screen effects may be provided.

Thereafter, if an image to which the chosen screen effect is to be applied is chosen in response to a user command, the controller 180 may display the chosen image on the display module 151, which is a touch screen (S305).

Thereafter, the controller 180 may determine whether a proximity signal has been output by the proximity sensor 141 (S310). If it is determined in operation S310 that a proximity signal has been output by the proximity sensor 141 due to an object (such as the user's finger) nearby and approaching the display module 151 or the proximity sensor 141, the controller 180 may apply the chosen screen effect to the chosen image (S315).

Thereafter, if the user chooses to save an edited image obtained by applying the chosen screen effect to the chosen image (S320), the controller 180 may save the edited image in the memory 160 (S325). Thereafter, the controller 180 may display a message indicating that the saving of the edited image is complete (S330). The edited image may be saved in the memory 160 as a file name allocated by the controller 180. A menu for choosing where to save the edited image and choosing a file name for the edited image may be displayed on the display module 151.

Operations S305 through S330 may be repeatedly performed until the user chooses to terminate the display of the chosen image (S335). In the second exemplary embodiment, more than one screen effect may be applied to the chosen image at the same time.

The screen effects that can be applied to an image displayed on the display module 151 will hereinafter be described in detail. The 'noise' effect adds noise to an image or controls noise in an image. The 'noise' effect may include an 'add noise' filter for adding color noise or black-and-white noise to part or all of an image, a 'despeckle' filter for removing noise from an image, a 'dust & scratches' filter for blurring colors in an image that do not harmonize with other colors in the image, and a 'median' filter for averaging the values of pixels in an image.

'Three-dimensional (3D) transform' effect transforms a two-dimensional (2D) image into a 3D image. Examples of the '3D transform' filter include a 'cloud' filter for painting a cloud by mixing foreground colors and background colors, a 'lens flare' filter for rendering the scatter of light reflected from a camera lens, a 'lighting' filter, and a 'texture fill' filter that can be used when using a grayscale image as a texture channel for a lighting filter.

The 'brush strokes' effect adds brush strokes to an image. The 'brush strokes' effect may include an 'accented edges' filter for highlighting the edges of an image, an 'angled strokes' filter for covering an image with an overlay of strokes, a 'crosshatch' filter for covering an image with gray transverse diagonal strokes so as to create the look of crosshatching with sharp pencils, a 'dark strokes' filter for crosshatching dark areas with short dark strokes and light areas with long, white strokes, an 'ink outlines' filter for outlining details of an image with thin lines so as to create a pen or ink drawing, a 'spatter' filter for applying splashes or droplets of paint to an image, and a 'Sumie' filter for imitating a Japanese painting with brushes and black ink on white rice paper.

The 'video' effect may include a 'National Television Standards Committee (NTSC) colors' filter for converting the gamut of colors of an image to those acceptable for TV reproduction and a 'de-interlace' filter for correcting an image captured from a moving picture.

The 'sharpen' effect increases the sharpness of an image. The 'sharpen' effect may include a 'sharpen' filter for increasing the contrast of adjoining pixels, a 'sharpen edges' filter for increasing the contrast of adjoining pixels, but only for contours or edges, a 'sharpen more' filter for increasing the contrast of adjoining pixels to a greater extent than the 'sharpen' filter does, and an 'unsharp mask' filter for enhancing fine details in an image.

The 'sketch' effect changes a color image into a dichromatic image. The 'sketch' effect may include a 'bas relief' filter for creating an effect of an illuminated relief background by painting dark areas of an image with foreground colors and bright areas with background colors, a 'chalk & charcoal' filter for drawing an image with chalk strokes and coal strokes, a 'charcoal' filter for simulating a drawing with charcoal in a foreground color on paper, a 'chrome' filter for simulating a chrome painting, a 'conte crayon' filter for simulating a drawing with a conte crayon, a 'graphic pen' filter for simulating a drawing with feather and ink, a 'halftone pattern' filter for adding halftone pattern to an image, a 'note paper' filter for giving the effect of notebook paper of a background color glued to paper of a foreground color, a 'photocopy' filter for imitating a photocopy, a 'plaster' filter for raising dark areas and lowering bright areas so as to imbue an image with relief qualities, a 'reticulation' filter for creating the effect of reticulation, a 'stamp' filter for creating a stamp effect, a 'torn edges' effect for imitating paper with torn edges, and a 'water paper' effect for imitating a drawing on wet paper.

The 'stylize' effect emphasizes the contours of an image or add volume to an image using different colors. The 'stylize' effect may include a 'diffuse' filter for dispersing the pixels of a whole image or part of the image in a chaotic manner so that the image becomes less focused, an 'emboss' filter for turning an image into a bas-relief, an 'extrude' filter for breaking an image into 3D blocks and aiming the 3D blocks at the center of the image, a 'find edges' filter for highlighting all the counters of an image and filling the rest with white, a 'glowing edges' filter for applying a neon effect to the contours of an image and filling the rest with black, a 'solarize' filter for tone-correcting an image so that both a negative and a positive can exist in the image, a 'tiles' filter for breaking an image into tiles, a 'trace contour' filter for tracing the contours of an image and outlining the traced contours with thin color lines, and a 'wind' filter for stretching out thin white or black lines from edges in an image so as to create motion blur.

The 'artistic' effect imitates the properties of typical paintings. The 'artistic' effect may include a 'colored pencil' filter for imitating a drawing with a color pencil on paper, a 'cutout' filter for turning an image into a print-like image by reducing the number of colors and simplifying contours, a 'dry brush' filter for imitating an oil painting, a 'film grain' filter for adding a grainy pattern to an image, a 'fresco' filter for imitating a fresco painting, a 'neon glow' filter for adding a neon glow to an image, a 'paint daubs' filter for imitating oil strokes, a 'palette knife' filter for imitating a drawing with a palette knife, a 'plastic wrap' filter for creating an effect of an image being wrapped in a plastic film, a 'poster edges' filter for reducing the number of colors in an image and outlining edges in the image with black lines, a 'rough pastels' filter for imitating a drawing with a dry pastel on a rough, textured material, a 'smudge stick' filter for softening and blurring an image with diagonal strokes that smudge the dark tones, a 'sponge' filter for creating the effect of sponging a paint on a surface, an 'underpainting' filter for imitating a drawing with oils on a relief surface, and a 'watercolor' filter for imitating a drawing with watercolors.

The 'distort' effect distorts a whole image or part of an image. The 'distort' effect may include a 'diffuse glow' filter for adding luminescence and noise to bright areas in an image, a 'displace' filter for displacing the pixels of an image using a displacement map image, a 'glass' filter for creating an effect of looking through glass, a 'ocean ripple' filter for creating an effect of looking through water, a 'pinch' filter for creating an effect of looking through a convex or concave lens, a 'polar coordinates' filter for plotting rectangular coordinate pixels in polar coordinates, a 'ripple' filter for simulating ripples, a 'shear' filter for bending an image into curves, a 'spherize' filter for sphering an image, a 'twirl' filter for twisting pixels from an image to form a spiral, a 'wave' filter for simulating ripples or waves, and a 'zigzag' filter for creating an effect of tossing a stone into a pond.

The 'texture' effect adds texture to an image. The 'texture' filter include a 'craquelue' filter for imitating cracks on ancient oil paintings, a 'grain' filter for adding color noise to an image so as to blur the image, a 'mosaic tiles' filter for laying mosaic texture to an image, a 'patchwork' filter for breaking an image into squares, a 'stained glass' filter for breaking an image into elements of glass in a stained-glass window, and a 'texturizer' filter for adding texture to an image.

The 'pixelate' effect combines or moves pixels of similar colors in an image. The 'pixelate' effect may include a 'color halftone' filter for rendering an image using dots, a 'crystallize' filter for creating an effect of looking through a crystal, a 'facet' filter for creating an effect of a hand-painted image by joining same color pixels into geometric figures, a 'fragment' filter for blurring an image by creating a plurality of copies of the image that are slightly shifted against each other, a 'mezzotint' filter for imitating a mezzotint print, a 'mosaic' filter for combining pixels into square cells, and a 'pointillize' filter for imitating a pointillism painting.

The 'blur' effect blurs an image by averaging neighboring pixels in areas of contrast. The 'blur' effect may include a 'blur' filter for blurring an image by averaging pixels in areas of contrast, a 'blur more' filter for blurring an image to a greater extent than the 'blur' filter does, a 'Gaussian blur' filter for varying the degree of blurring an image, a 'motion blur' filter for creating a motion effect, a 'radial blur' filter for enabling blurring within a concentric circle from a focal point in all directions, and a 'smart blur' filter for blurring an image without affecting the edges in the image.

The screen effects that can be applied to an image displayed on the display module 151 may also include a 'custom' effect for allowing the user to create any desired filter effect, a 'high pass' effect for rendering areas with low contrast in gray, a 'maximum' effect for enlarging highlighted areas and reducing shadow areas, a 'minimum' effect for enlarging shadow areas and reducing highlighted areas, and an 'offset' effect for shifting an image horizontally and/or vertically by a number of pixels.

In this manner, it is possible to apply various screen effects to an image displayed on the display module 151 in response to a proximity signal and save the resulting image for later use for various purposes.

Figure 6:
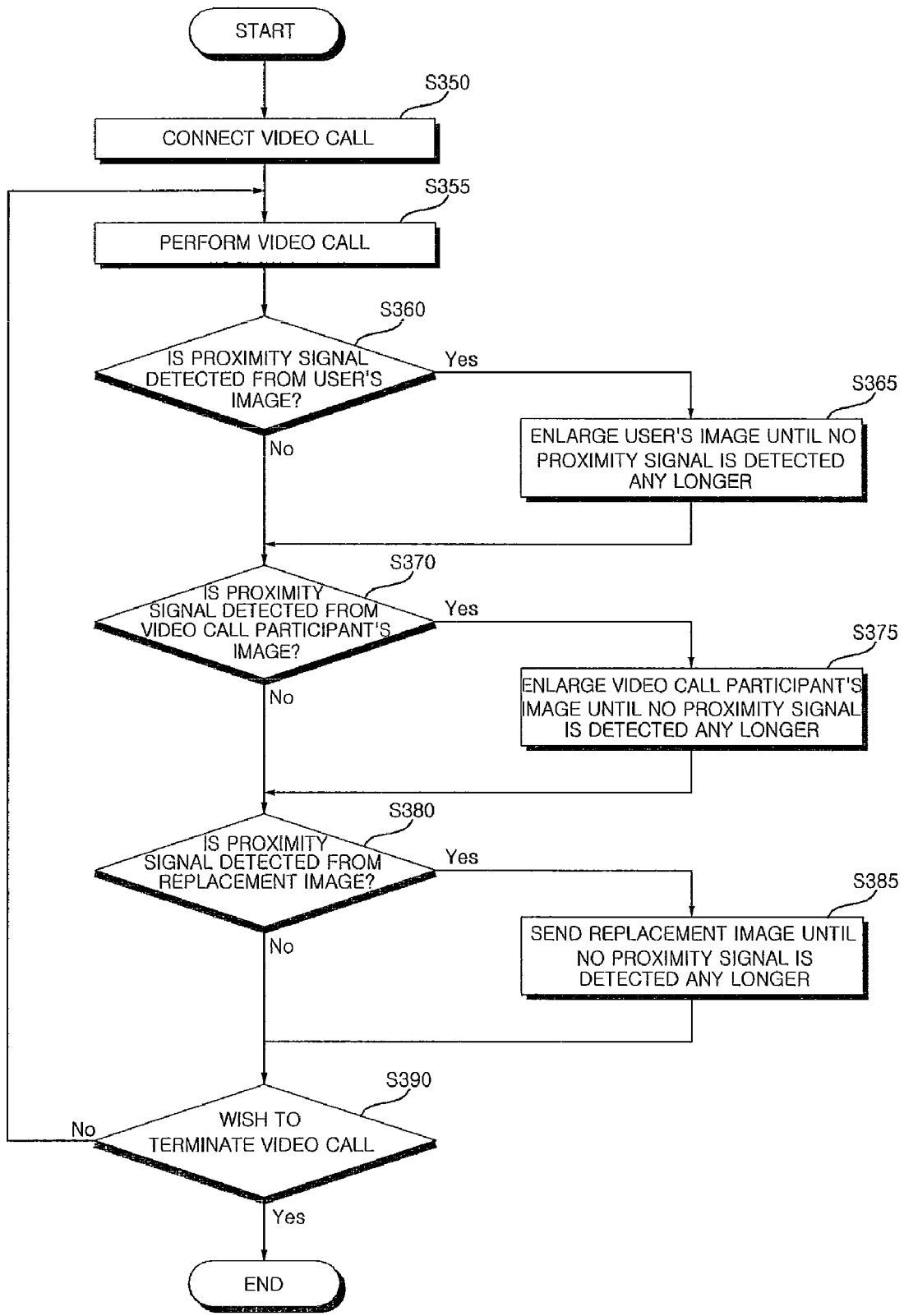
FIG. 6 illustrates a flowchart of a method of controlling a mobile terminal according to a third exemplary embodiment of the present invention.

FIG. 6 illustrates a flowchart of a method of controlling a mobile terminal according to a third exemplary embodiment of the present invention. More specifically, FIG. 6 illustrates how to control a screen in response to a proximity signal during a video call. Referring to FIG. 6, if a request for making a video call to an input phone number is issued by pressing a shortcut key for making a video call, the controller 180 may control the wireless communication unit 110 to connect a video call to the input phone number (S350) and to perform the video call (S355). During the video call, the user's image and the other party's image may be displayed on the display module 151, and audio data received from the other party's mobile phone may be output by the audio output module 153.

If a proximity signal indicating the existence of an object (such as the user's finger) nearby and approaching the display module 151 is detected from the user's image (S360), the controller 180 may enlarge the user's image until no proximity signal is detected any longer (S365). The scale of enlargement of the user's image may be determined in advance. If the scale of enlargement of the user's image is yet to be determined, the user's image may be displayed on the entire display module 151.

The scale of enlargement of the user's image may increase according to the degree to which the nearby and approaching object is close to the display module 151. If the user's image or the other party's image is touched, the corresponding image may be displayed on the entire display module 151.

If no proximity signal is detected after the enlargement of the user's image, the user's image may be reduced back to its original size. If the user's image is enlarged in response to the detection of a proximity signal, an indicator icon indicating, for example, the scale of enlargement of the user's image, an icon indicating the detection of an object nearby and approaching the display module 151, and an icon indicating the degree to which the object is close to the mobile terminal 151 may be displayed on the display module 151.

If a proximity signal indicating that the user's finger is nearby and approaching the display module 151 is detected from a replacement image, which is displayed as a replacement for the user's image (S380), the controller 180 may control the replacement image to be continuously transmitted to the other party's mobile phone until no proximity signal is detected any longer (S385).

Operations S355 through S385 may be repeatedly performed until the user chooses to terminate the video call (S390). In this manner, it is possible to perform various screen-control operations in response to a proximity signal during a video call.

Figure 7:
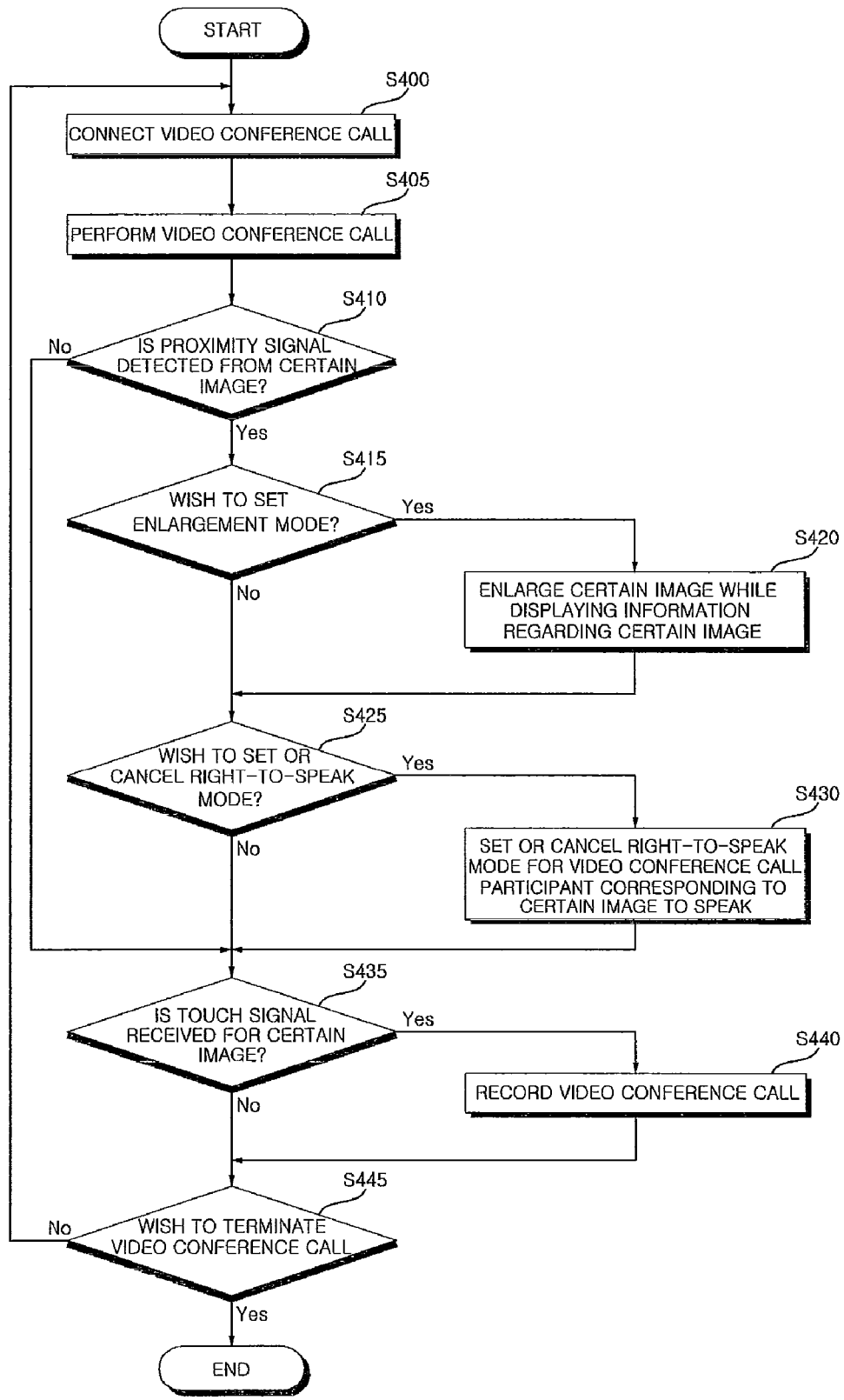
FIG. 7 illustrates a flowchart of a method of controlling a mobile terminal according to a fourth exemplary embodiment of the present invention.

FIG. 7 illustrates a flowchart of a method of controlling a mobile terminal according to a fourth exemplary embodiment of the present invention. More specifically, FIG. 7 illustrates how to control a screen in response to a proximity signal during a video conference call. Referring to FIG. 7, if a request for making a video conference call to an input phone number is issued, the controller 180 may control the wireless communication unit 110 to connect a video conference call to the input phone number (S400) and may perform the video conference call (S405). During the video conference call, the user's image and the other video conference call participants' images may be displayed on the display module 151, and audio data received from the other video conference call participants' mobile phones may be output by the audio output module 153.

If a proximity signal indicating the existence of an object (such as the user's finger) nearby and approaching the display module 151 is detected from one of the images displayed on the display module 151 in response to (S410) and an enlargement mode is set, the controller 180 may enlarge the image approached by the user's finger and may display information regarding the enlarged image (S420). If the user chooses to set a right-to-speak mode for the video conference call participant corresponding to the image approached by the user's finger (S425), the controller 180 may set the right-to-speak mode for the corresponding video conference call participant. It may be determined in advance whether to enlarge an image in response to the detection of a proximity signal and whether to set or cancel the right-to-speak mode in response to the detection of a proximity signal. If one of the other video conference call participants' images is touched (S435), the controller 180 may control a video call with the video conference call participant corresponding to the touched image to be recorded (S440).

Operations S405 through S440 may be repeatedly performed until the user chooses to terminate the video conference call (S445).

In this manner, it is possible to perform various screen-control operations in response to a proximity signal during a video conference call.

Figure 8:
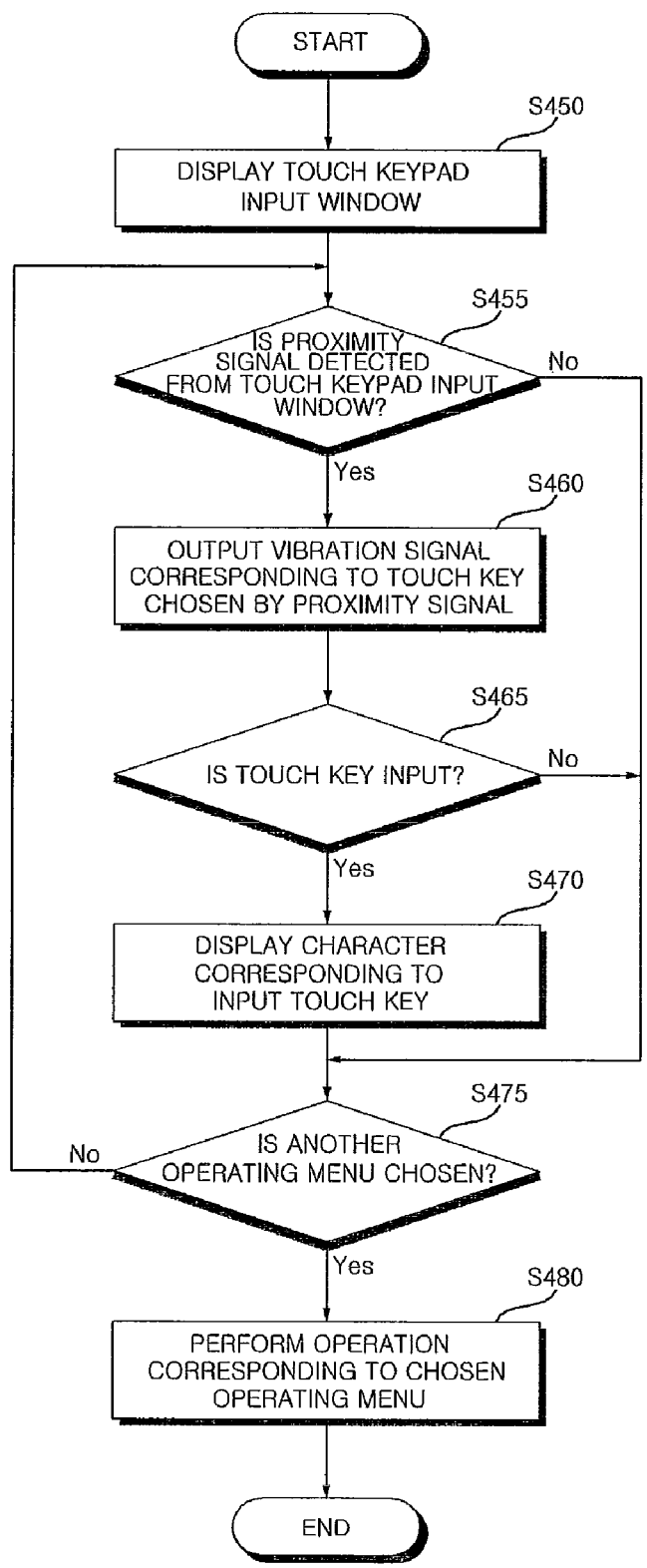
FIG. 8 illustrates a flowchart of a method of controlling a mobile terminal according to a fifth exemplary embodiment of the present invention.

FIG. 8 illustrates a flowchart of a method of controlling a mobile terminal according to a fifth exemplary embodiment of the present invention. Referring to FIG. 5, if a character-input mode such as a voice call mode, a short messaging service (SMS) mode, or a phone number- or file-search mode is chosen, the controller 180 may display a touch keypad input window including a plurality of touch keys for inputting numerals and characters on the display module 151, which is a touch screen (S450).

Thereafter, if a proximity signal indicating the existence of an object (such as the user's finger) nearby and approaching one of the touch keys of the touch keypad input window is detected (S455), the controller 180 may control a vibration signal corresponding to the touch key approached by the user's finger to be output (S460). More specifically, the controller 180 may control the vibration module 157 to output different variation signals for different touch keys when the different touch keys are respectively approached by the user's finger. The intensity and pattern of vibration output by the vibration module 157 may be set by the user. The touch key approached by the user's finger may be displayed differently from the other touch keys so as to be easily distinguishable.

If one of the touch keys of the touch keypad input window is input in response to a touch input (S465), the controller 180 may display a character corresponding to the input touch key in a certain area on the display module 151 (S470). Alternatively, the controller 180 may perform an operation corresponding to the input touch key, instead of displaying a character.

If an operating mode other than the character-input mode is chosen (S475), the controller 180 may control an operation corresponding to the chosen operating mode to be performed (S480). Examples of the operation corresponding to the chosen operating mode include performing a call, saving or editing an input character string, and choosing an operating menu. If no other operating mode is chosen (S475), the method returns to operation S455.

In this manner, it is possible for the user to easily recognize which of the touch keys of the touch keypad input window is approached based on the pattern of vibration output by the mobile terminal 100.

Figure 9:
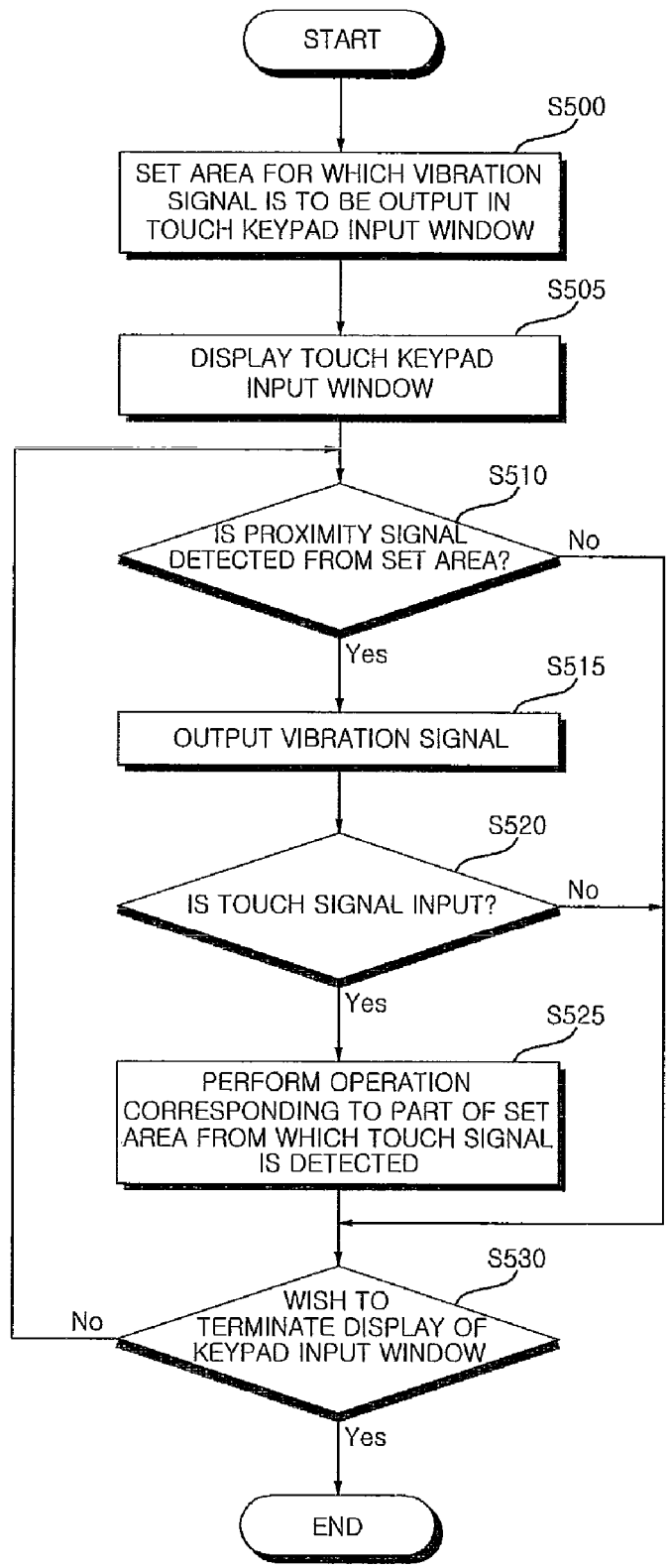
FIG. 9 illustrates a flowchart of a method of controlling a mobile terminal according to a sixth exemplary embodiment of the present invention.

FIG. 9 illustrates a flowchart of a method of controlling a mobile terminal according to a sixth exemplary embodiment of the present invention. Referring to FIG. 9, a vibration area for which a vibration signal is to be output when a touch keypad input window including a plurality of touch keys is approached by an object such as the user's finger may be set in the touch keypad input window (S500). If the touch keypad input window is a numeric keypad input window, part of the touch keypad input window possibly including one or more protrusions for easy tactile identification of the keypads, for example, a central portion of the touch keypad input window, may be set as the vibration area.

If a character-input mode such as a voice call mode, an SMS mode, or a phone number- or file-search mode is chosen, the controller 180 may display the touch keypad input window on the display module 151 (S505). If a proximity signal indicating the existence of an object (such as the user's finger) nearby and approaching the vibration area set in the touch keypad input window is detected from one of the images displayed on the display module 151 in response to (S510), the controller 180 may control a vibration signal to be output (S515). As a result, the user may easily identify the positions of the touch keys of the touch keypad input window.

If a touch signal for a certain part of the touch keypad input window is input (S520), the controller 180 may perform an operation corresponding to the certain part of the touch keypad input window to be performed (S525). More specifically, if the certain part of the touch keypad input window is a touch key, the controller 180 may display a character corresponding to the touch key. On the other hand, if the certain part of the touch keypad input window is a key for choosing an operating mode other than the character-input mode, the controller 180 may control an operation corresponding to the operating mode to be performed. Operations S510 through S525 may be repeatedly performed until the user chooses to terminate the display of the touch keypad input window (S530).

In this manner, it is possible to provide the functions of Braille-like protrusions formed on a typical keypad by using a touch keypad input window.

Figure 10:
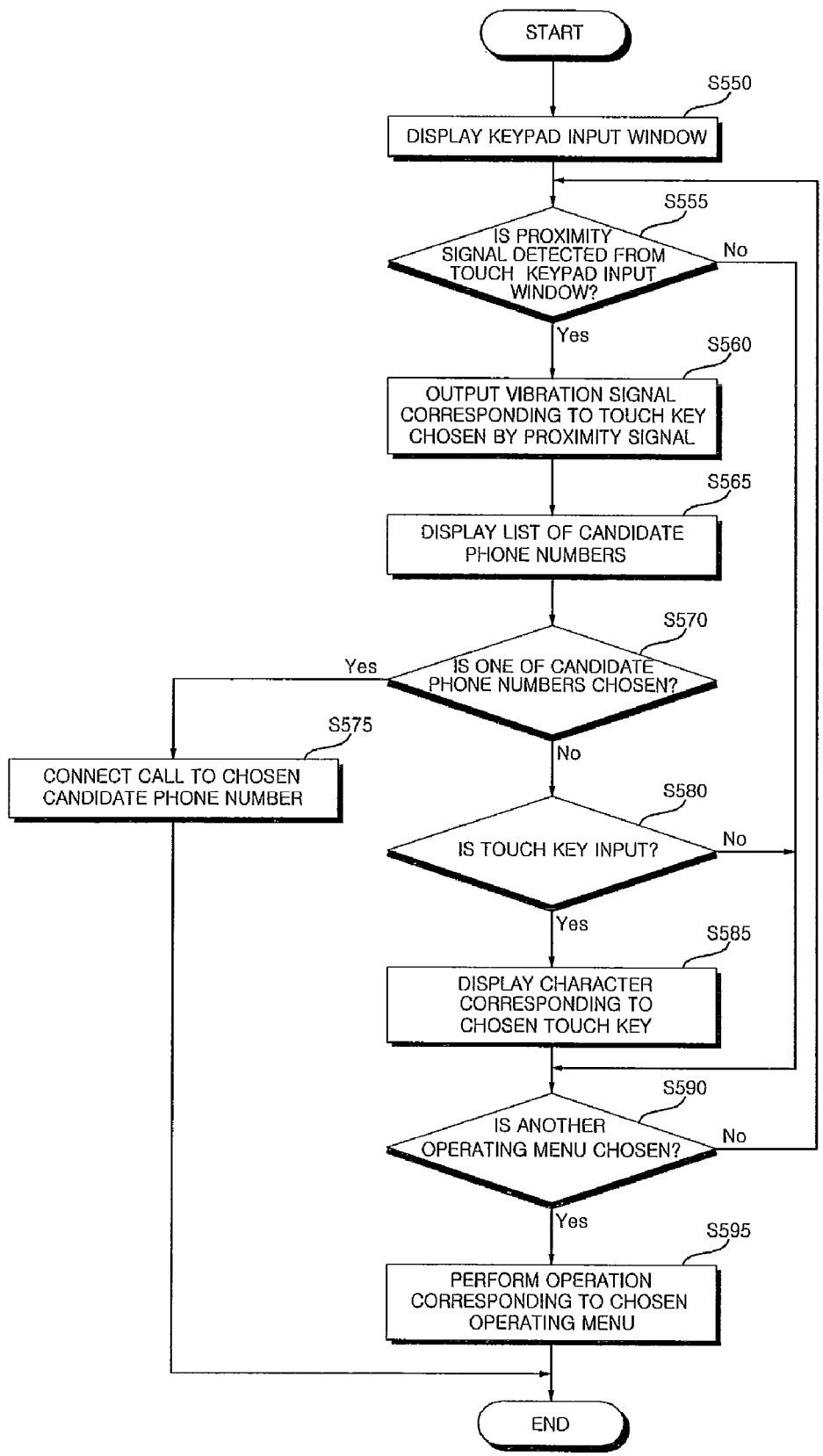
FIG. 10 illustrates a flowchart of a method of controlling a mobile terminal according to a seventh exemplary embodiment of the present invention.

FIG. 10 illustrates a flowchart of a method of controlling a mobile terminal according to a seventh exemplary embodiment of the present invention. Referring to FIG. 10, operations S550 through S560 are the same as their respective counterparts of FIG. 4.

If one of a plurality of touch keys of a touch keypad input window is chosen by the user's finger nearby and approaching the touch keypad input window, the controller 180 may display a list of candidate phone numbers including a numeral corresponding to the chosen touch key on the display module 151 (S565).

If one of the candidate phone numbers is chosen (S570), the controller 180 may connect a call to the chosen candidate phone number (S575). Alternatively, the controller 180 may send a message or connect a video call to the chosen candidate phone number.

If none of the candidate phone numbers are chosen and one of the touch keys of the touch keypad input window is input by being touched (S580), the controller 180 may display a character corresponding to the input touch key on a certain part of the display module 151 (S585). If the input touch key is a key for choosing an operating mode, the controller 180 may control an operation corresponding to the operating mode to be performed.

If an operating menu other than a current operating menu is chosen (S590), the controller 180 may perform an operation corresponding to the chosen operating menu to be performed (S595). Otherwise, the method returns to operation S555. The candidate phone number list displayed in operation S565 may include one or more phone numbers including not only a numeral corresponding to a touch key chosen in response to a touch signal but also a numeral corresponding to a touch key chosen in response to a proximity signal.

In this manner, it is possible to quickly connect a call to a phone number selected from a list of candidate phone numbers in response to a proximity signal. In the seventh exemplary embodiment, a list of candidate phone numbers including a numeral corresponding to a touch key chosen in response to a proximity signal may be displayed. However, the present invention is not restricted to this. That is, a speed dial number corresponding to a touch key chosen in response to a touch signal may be displayed.

Figure 11:
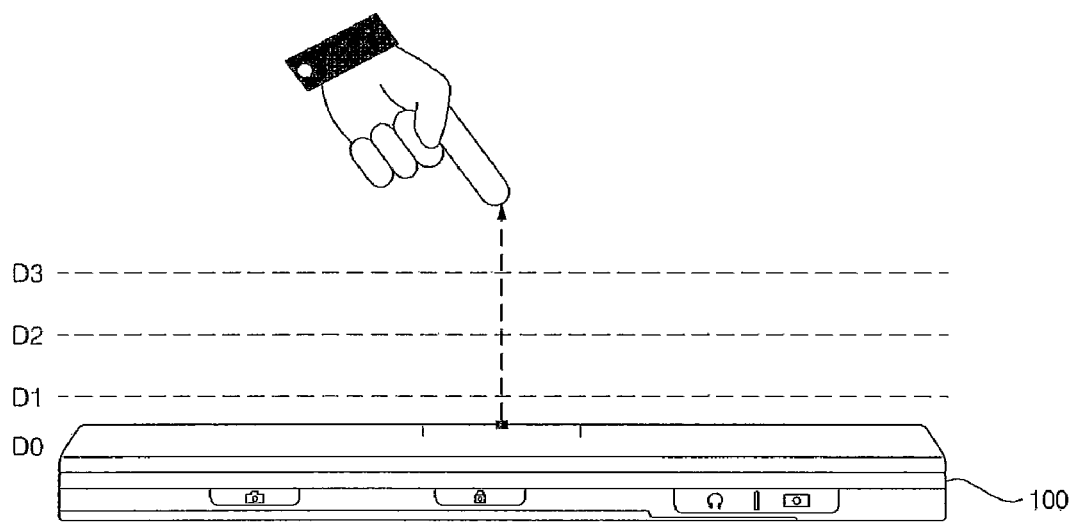
FIG. 11 illustrates a diagram for explaining the operation of a proximity sensor of a mobile terminal according to the present invention.

FIG. 11 illustrates a diagram for explaining the operation of the proximity sensor 141 shown in FIG. 1. Referring to FIG. 11, if an object, for example, the user's finger, is nearby and approaching the display module 151, the proximity sensor 141 may detect the user's finger and may output a proximity signal. The proximity sensor 141 may output different proximity signals according to the distance from the user's finger. For example, a proximity signal output by the proximity sensor 141 when the user's finger is located at position D3 may be different from a proximity signal output by the proximity sensor 141 when the user's finger is located at position D2 or D1. More than one proximity sensor 141 having different detection ranges may be provided. In this case, it is possible to determine how close the user's finger is to the mobile terminal 100 by comparing a plurality of proximity signals respectively output by the proximity sensors 141.

Alternatively, more than one proximity sensor 141 may be disposed in different regions in the display module 151. In this case, it is possible to determine which part of the display module 151 is touched or approached by the user's finger and/or whether the user's finger moves within a close range of the display module 151 by determining which of the proximity sensor 141 outputs a proximity sensor. Therefore, the control unit 180 may perform various control operations according to the degree to which the user's finger is close to the display module 151 and the position on the display module 151 touched or approached by the user's finger.

FIGS. 12 through 39 illustrate diagrams of various screens for explaining the methods of the first through seventh exemplary embodiments.

More specifically, FIGS. 12 through 18 illustrate diagrams for explaining the method of the first exemplary embodiment.

Figure 12:
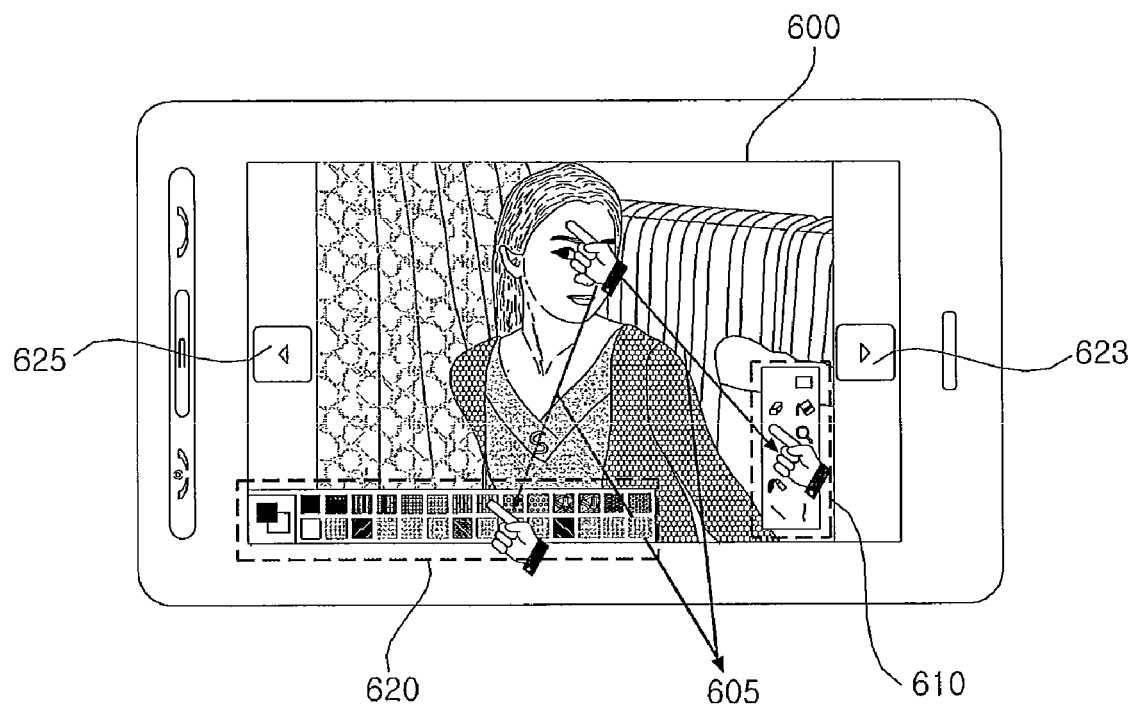
FIGS. 12 through 18 illustrate diagrams of various screens for explaining the method of the first exemplary embodiment.

Referring to FIG. 12, if the user touches an image 600 displayed on the display module 151 with his or her finger, an image-editing menu including an image-editing function selection menu 610 and a color selection menu 620 may be displayed.

If the user moves his or her finger over to the image-editing function selection menu 610 or the color selection menu 620 while maintaining contact with the display module 151 and then removes the finger from the display module 151, as indicated by reference numeral 605, an image-editing function or a color to be used to edit the image 600 may be chosen.

In this manner, various image-editing functions or various colors may be chosen according to the distance between the user's finger and the display module 151.

Alternatively, once one of a plurality of items of the image-editing function selection menu 610 or the color selection menu 620 is chosen by being touched, the editing of the image 600 may be performed in response to a proximity signal.

A line or a figure drawn on the image 600 may be moved by touching and then dragging the middle of the line or the figure. Icons 623 and 625 may be used to view images subsequent to or previous to the image 600.

Figure 13:
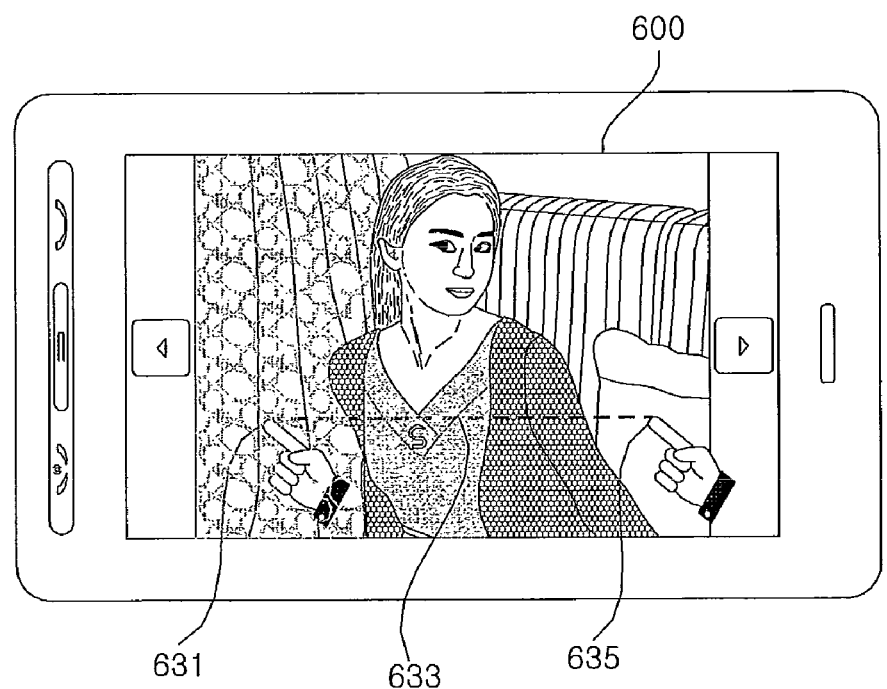

Referring FIG. 13, if a 'draw lines' function is chosen from the image-editing menu 610, a menu for selecting one of a plurality of line styles may be displayed, and the user may select a desired line style from the menu by adjusting the degree to which his or her finger is close to the display module 151. The user may select a desired color to draw with from the color selection menu 620. Once a desired line style and a desired color are chosen, the user may move his or her finger from a point 631 to a point 635 within the close vicinity of the display module 151, as indicated by reference numeral 633. As a result, a line with the chosen line style and the chosen color may be drawn on the image 600. Alternatively, a line style may be chosen in response to a proximity signal, and a line may be drawn in response to a touch-and-drag input. Once a line is drawn on the image 600 in the above-mentioned manner, the user may rotate the line by dragging the line while pressing down on one end of the line, or may move the line by dragging the line while pressing down on the middle of the line. The style of the line drawn on the image 600 may vary according to the degree to which the user's finger is close to the display module 151.

Figure 14:
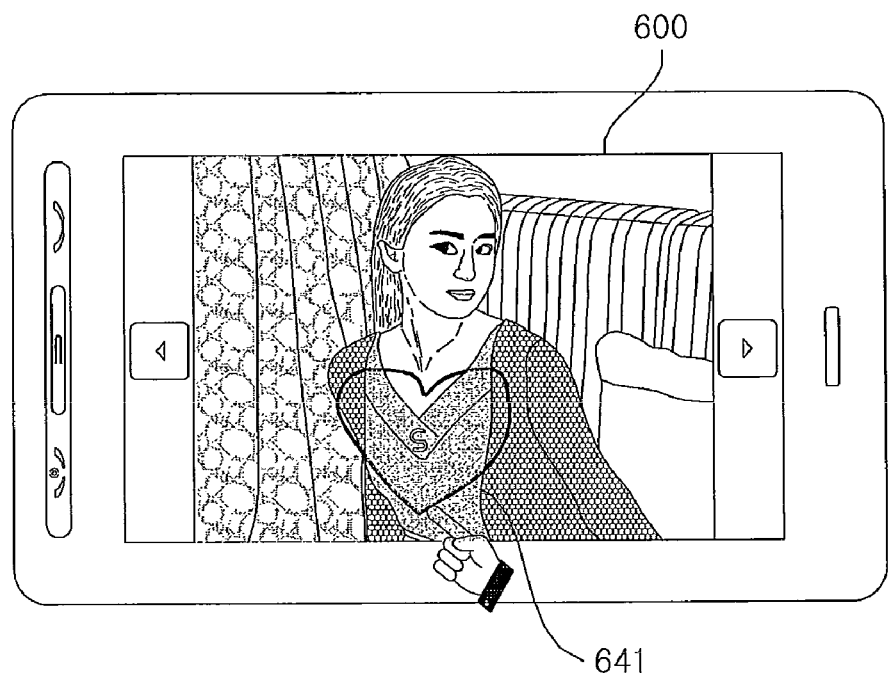

Referring to FIG. 14, if a 'paintbrush' function is chosen from the image-editing function 610, a menu for selecting a paintbrush size may be displayed, and the user may select a desired paintbrush size from the menu by adjusting the degree to which his or her finger is close to the display module 151. Once a desired paintbrush is chosen, the user may draw any figure on the image 600 with the chosen paintbrush by placing his or her finger over any desired point on the image 600 and then moving the finger. Even during the execution of the 'paintbrush' function, the paintbrush size may vary according to the degree to which the user's finger is close to the display module 151. Once a figure is drawn on the image in the above-mentioned manner, the user may rotate the figure by dragging the figure while pressing down on one end of the figure, or may move the figure by dragging the figure while pressing down on the middle of the figure.

Figure 15:
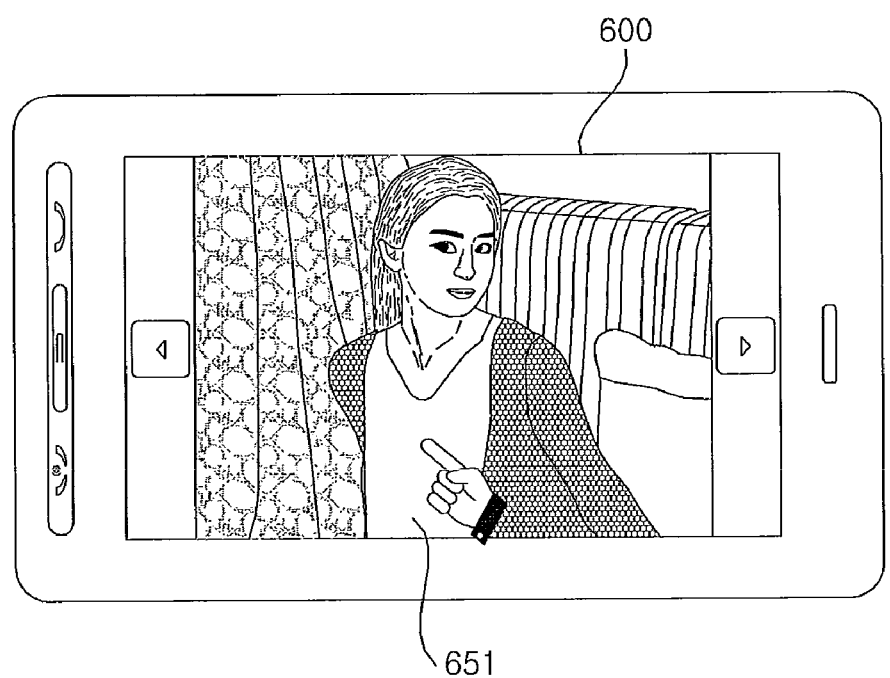

Referring to FIG. 15, if an 'erasure' function is chosen from the image-editing menu 610, a menu for selecting an erasure size may be displayed, and the user may select a desired erasure size from the menu by adjusting the degree to which his or her finger is close to the display module 151. Thereafter, if the user places his or her finger in the close vicinity of the display module 151 and then moves the finger over the image 600, the image 600 may be gradually erased according to the movement of the finger, as indicated by reference numeral 651. Even during the erasure of the image 600, the erasure size may vary according to the degree to which the user's finger is close to the display module 151.

Figure 16:
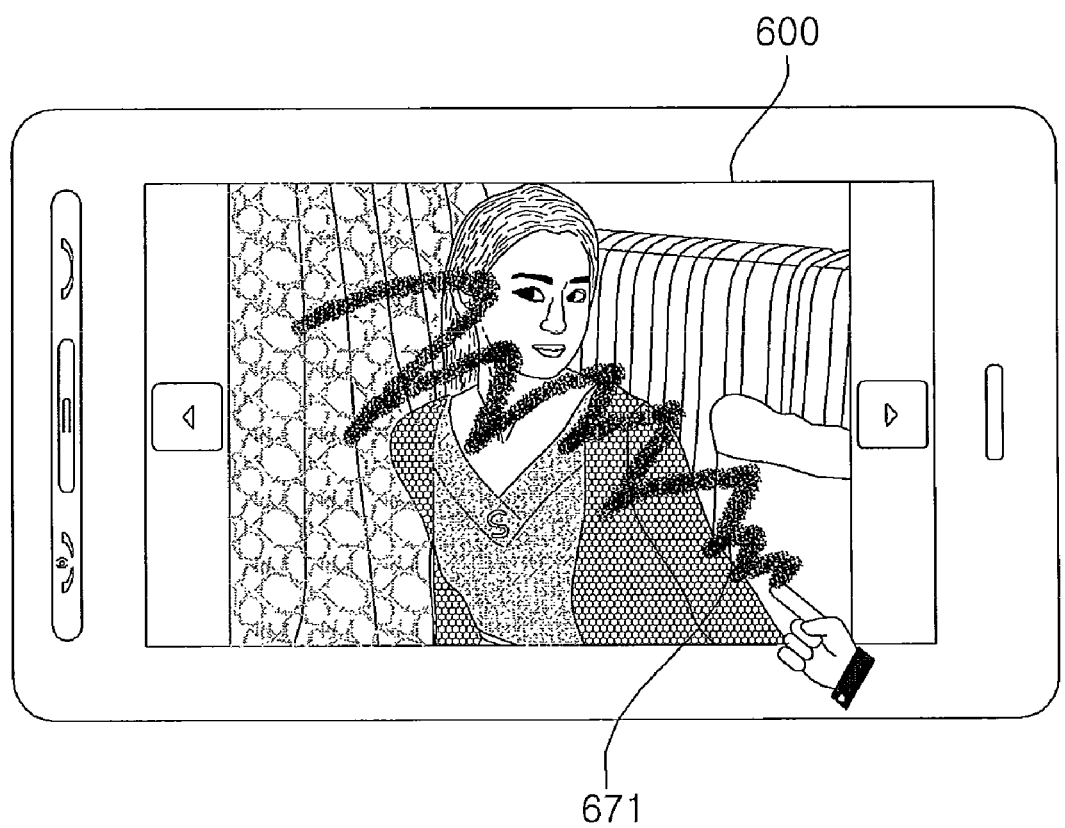

Referring to FIG. 16, the user may choose a 'spray' function from the image-editing menu 610 by placing his or her finger over the image-editing menu 610. Thereafter, the 'spray' function may be executed in a similar manner to those mentioned above.

Figure 17:
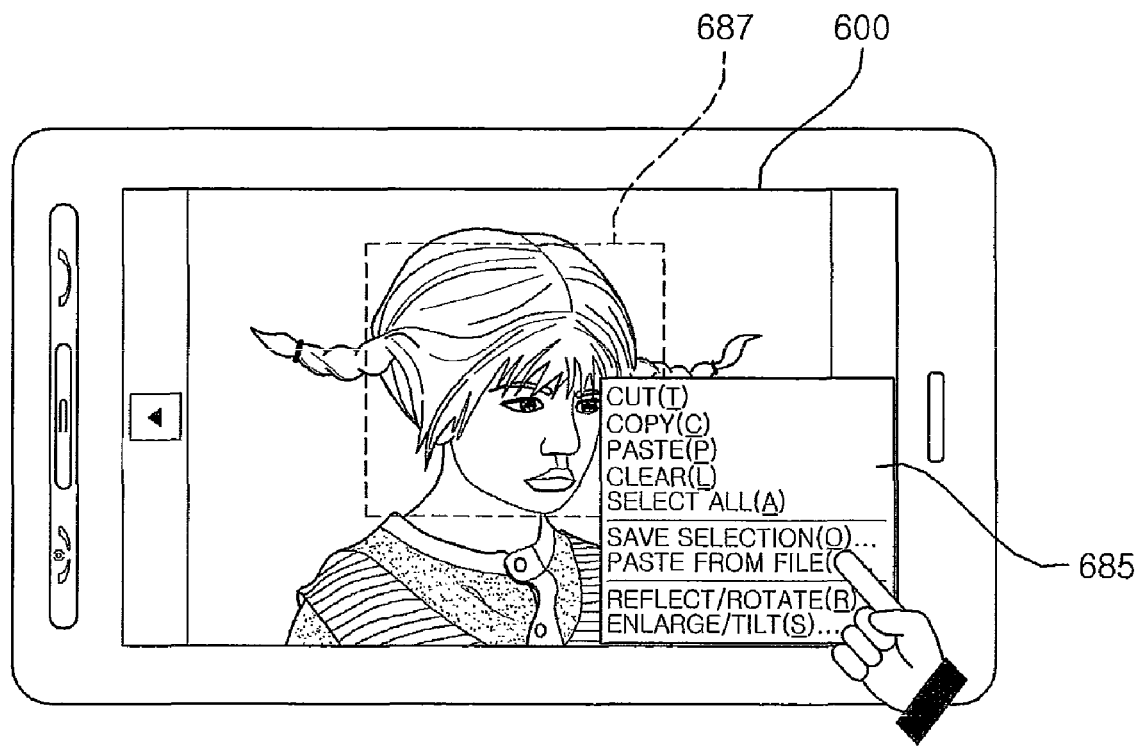

Referring to FIG. 17, if the user chooses a 'selection' function from the image-editing menu 600 and then moves his or her finger over the image 600 within the close vicinity of the display module 151, a rectangular area 687 in the image 600 may be selected. Thereafter, if the user touches the rectangular area 687, an option screen 685 like the one available with a right click of the mouse may be displayed. If the user chooses a desired option from the option screen 650, a function corresponding to the chosen option may be performed.

FIGS. 18 through 27 illustrate diagrams for explaining the method of the second exemplary embodiment.

Figure 18:
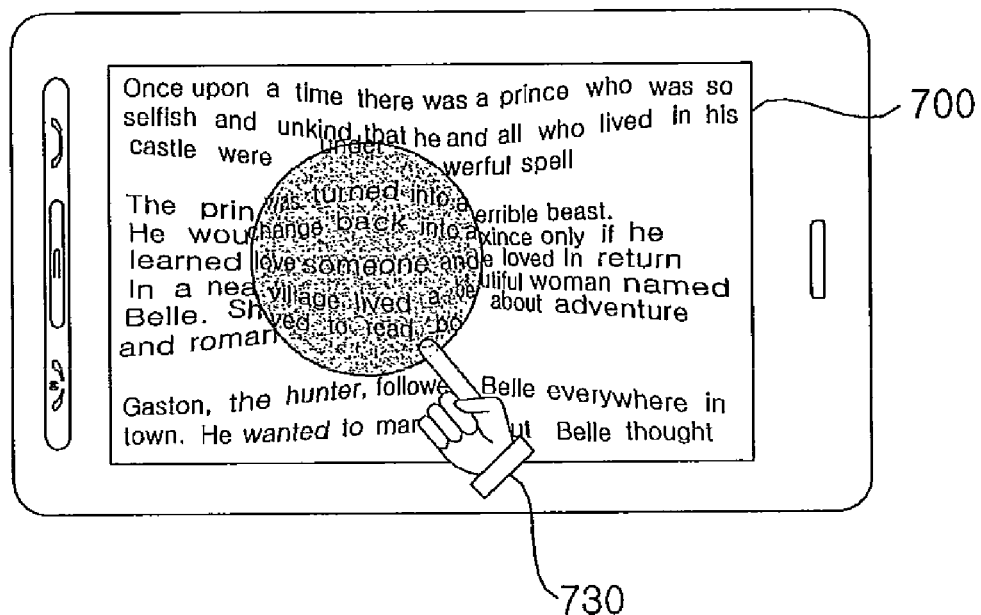
Figure 19:
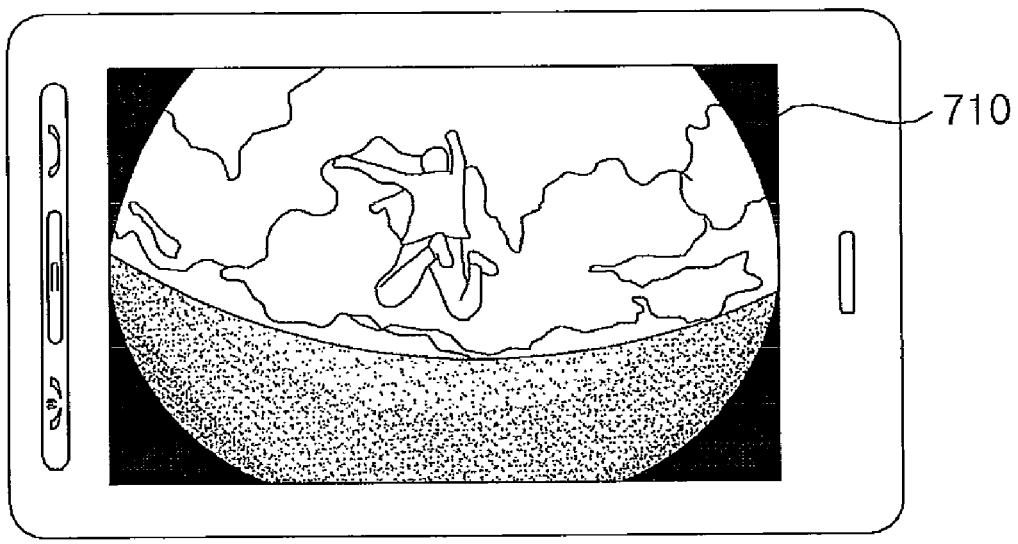
FIGS. 19 through 27 illustrate diagrams of various screens for explaining the method of the second exemplary embodiment.
Figure 20:
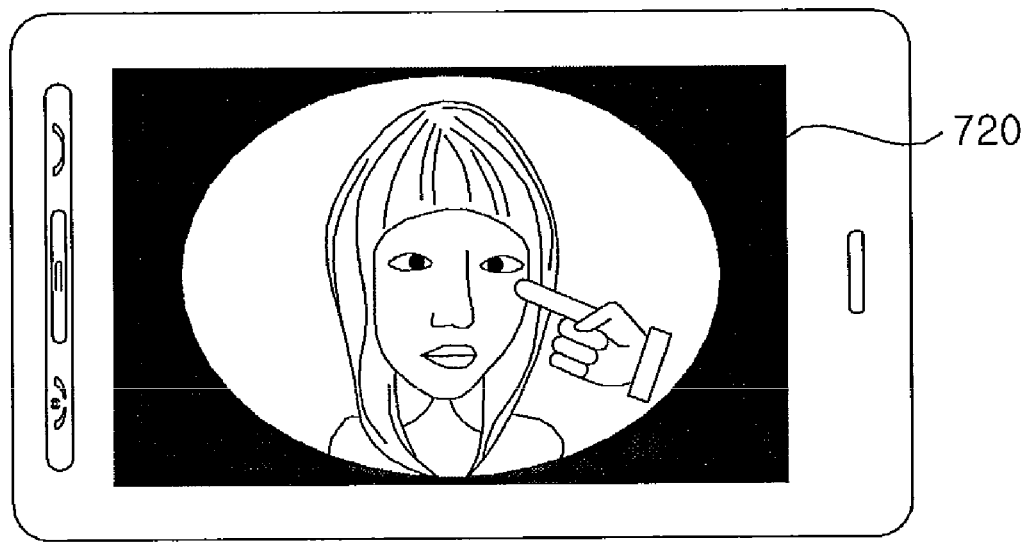

FIGS. 18 through 20 illustrate how to apply the 'pinch' effect to an image on the display module 151 in response to a proximity signal. Referring to a screen 700 of FIG. 18, a convex lens filter may be applied to part of an image 700, as indicated by reference numeral 703, in response to the user's finger approaching the display module 151. Referring to a screen 710 of FIG. 19, the convex lens filter may be applied to an entire image displayed on the display module 151 in response to the user's finger approaching the display module 151. The range of application of the convex lens filter may vary according to the degree to which the user's finger is close to the display module 151. If the user's finger approaches and then touches an image displayed on the display module 151, the convex lens filter may be applied to the entire image. Referring to a screen 720 of FIG. 20, a concave lens filter may be applied to an image displayed on the display module 151 in response to the user's finger approaching the display module 151. The range of application of the concave lens filter may vary according to the degree to which the user's finger is close to display module 151.

Figure 21:
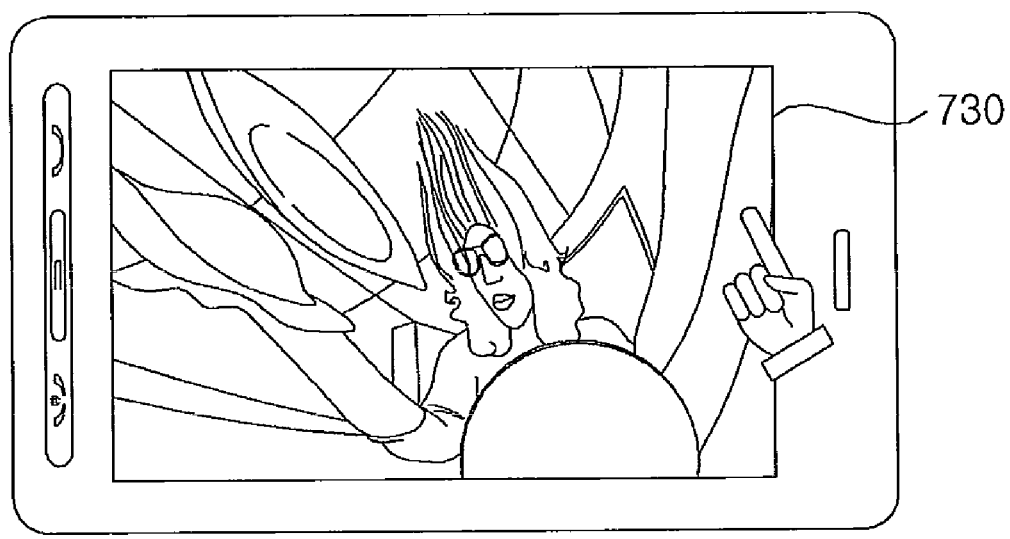
Figure 22:
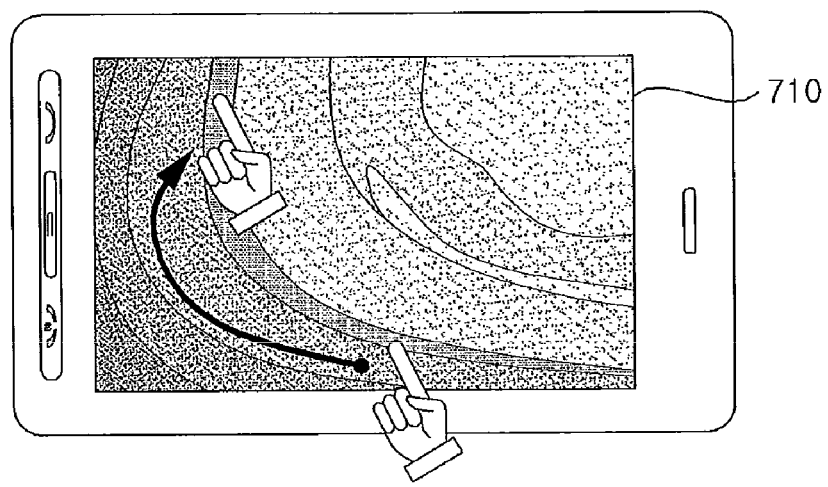
Figure 23:
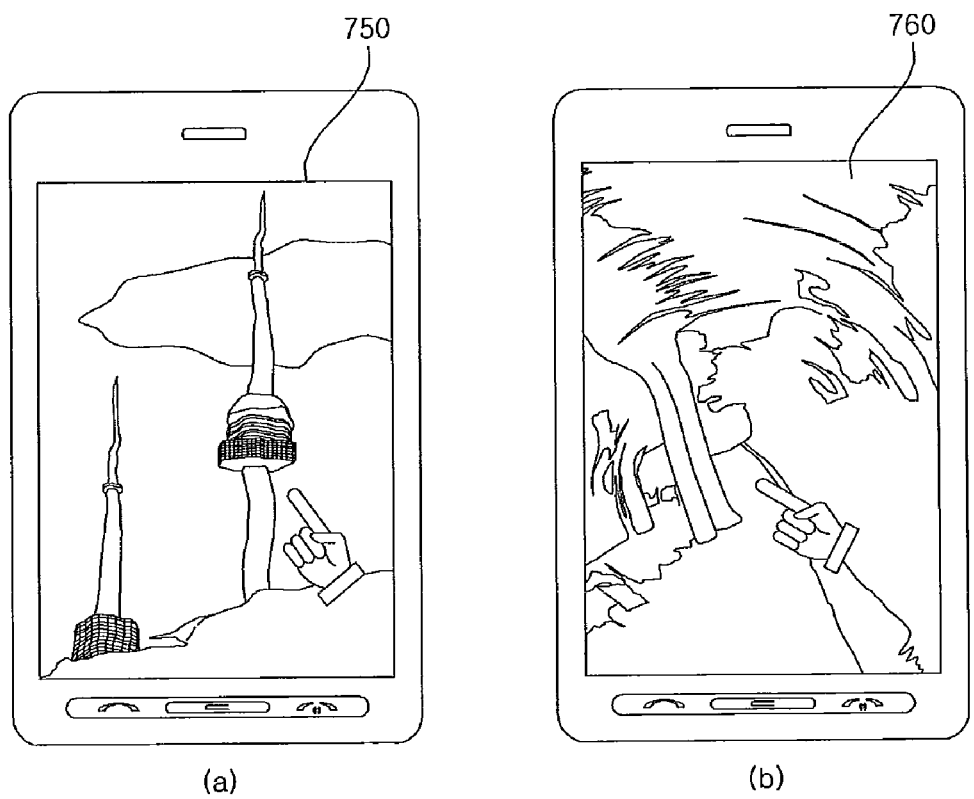

FIGS. 21 through 23 illustrate how to apply the 'distort' effect to an image on the display module 151 in response to a proximity signal. Referring to a screen 730 of FIG. 21, the 'distort' effect may be applied to a portion of an image approached by the user's finger. Referring to a screen 740 of FIG. 22, the 'distort' effect may be applied to portions of an image on a path 742 of movement of the user's finger within the close vicinity of the display module 151. Referring to a screen 750 of FIG. 23(a), the 'shear' effect may be applied to an image on the display module 151 in response to a proximity signal. Referring to a screen 760 of FIG. 23(a), the 'twirl' effect may be applied to an image on the display module 151 in response to a proximity signal. The 'distort' effect may be applied to an entire image displayed on the display module 151 or applied only to certain objects in the image.

Figure 24:
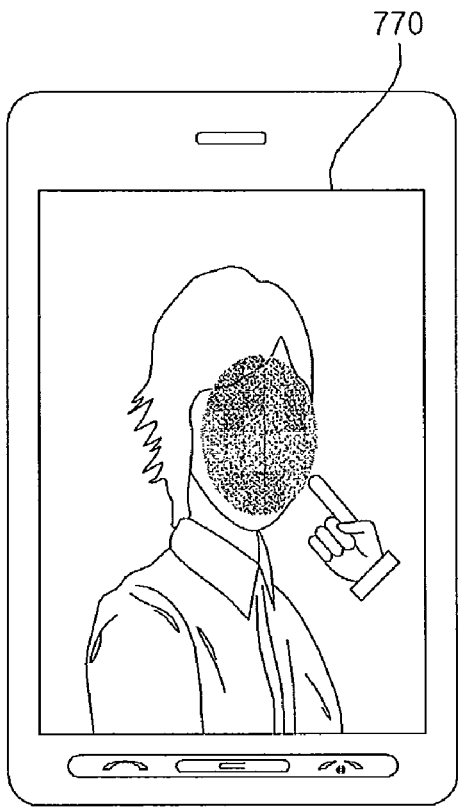
Figure 25:
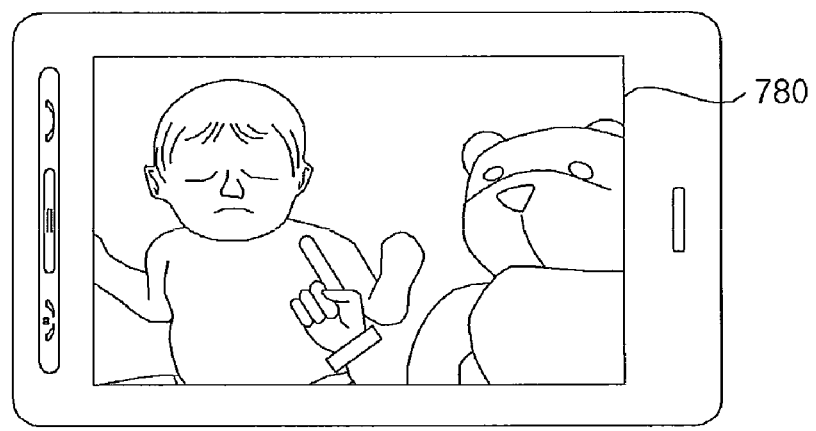

FIGS. 24 and 25 illustrate how to apply the 'mosaic' effect to an image on the display module 151 in response to a proximity signal. Referring to a screen 770 of FIG. 24, the 'mosaic' filter may be applied to a portion of an image on the display module 151 by the user's finger approaching the display module 151. Alternatively, referring to a screen 780 of FIG. 25, the 'mosaic' filter may be applied to an entire image on the display module 151 by the user's finger approaching the display module 151. The range of application of the 'mosaic' filter may vary according to the degree to which the user's finger is close to the display module 151.

Figure 26:
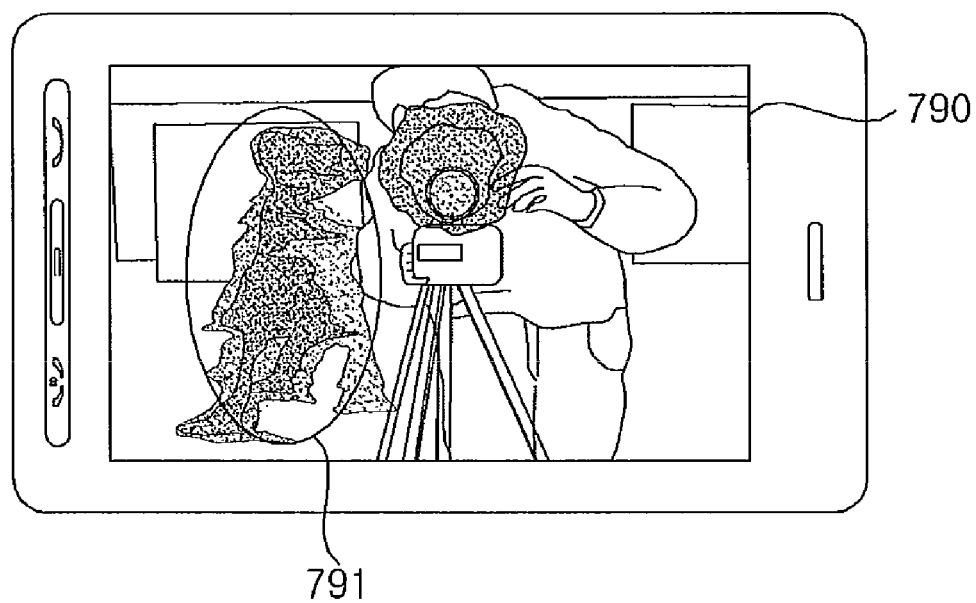
Figure 27:
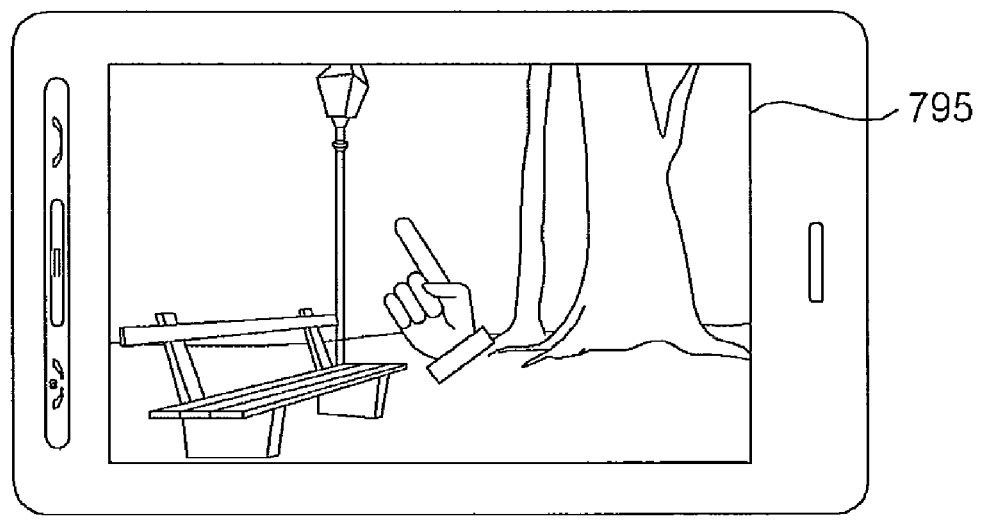

FIGS. 26 and 27 illustrate how to apply other screen effects to an image on the display module 151 in response to a proximity signal. Referring to a screen 790 of FIG. 26, an 'afterimage' effect may be applied to an image on the display module 151 in response to a proximity signal. Referring to a screen 795 of FIG. 27, an image displayed on the display module 151 may be turned into a black-and-white image in response to a proximity signal. Various screen effects other than those set forth herein may be applied to an image on the display module 151 in response to a proximity signal. Once a screen effect is applied to an image displayed on the display module 151, the image may be saved and may thus be used later for various purposes.

Figure 28:
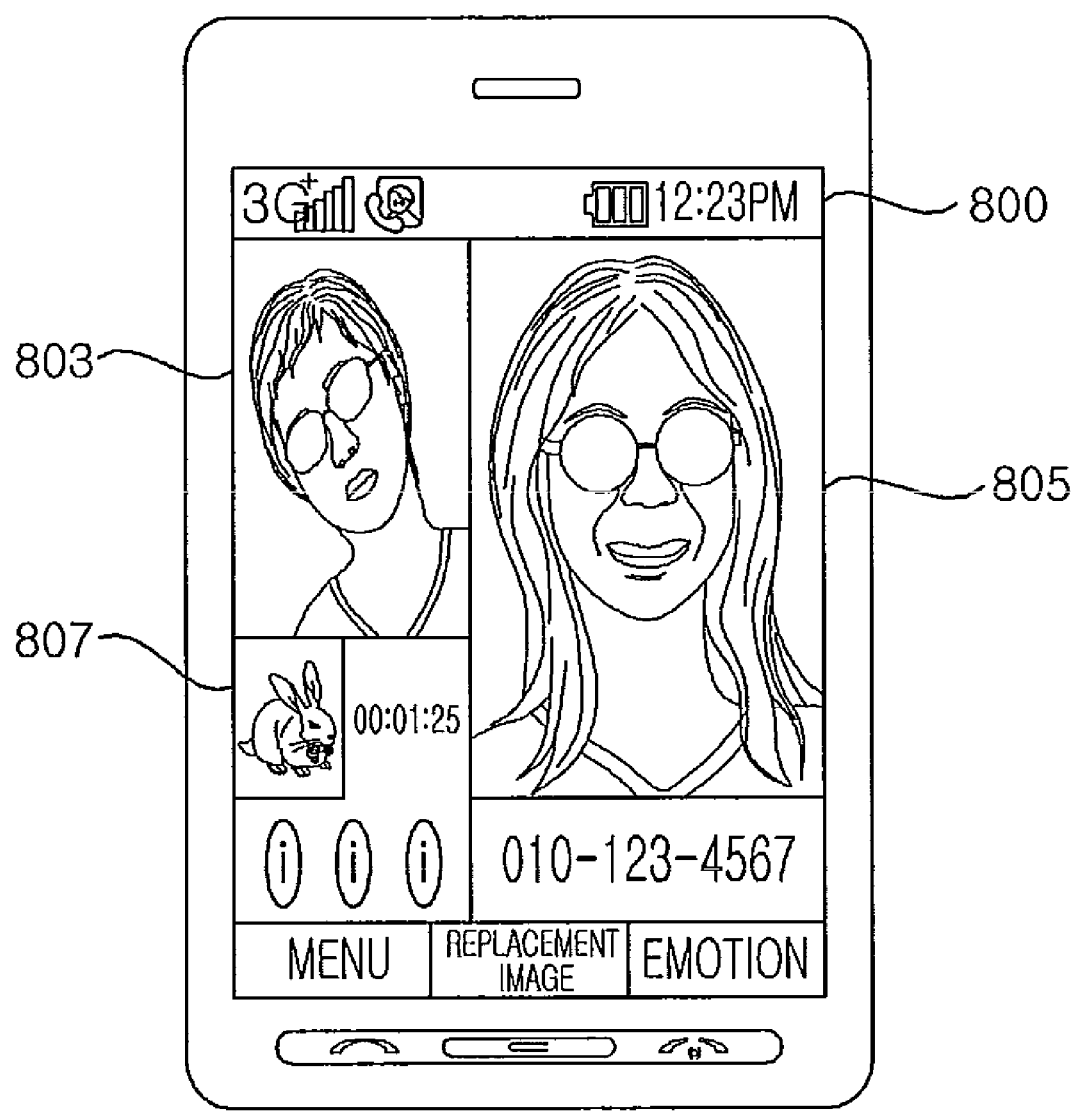

FIGS. 28 through 33 illustrate diagrams for explaining the method of the third exemplary embodiment. Referring to FIG. 28, during a video call, the user's image 803, the other party's image 805 and a replacement image 807 that can be sent to the other party's mobile phone instead of the user's image 803 may be displayed on a video call screen 800. Various menu items for sending the replacement image 807 and for sending emoticons may be displayed at the bottom of the video call screen 800. The other party's phone number may be displayed below the other party's image 805.

If the other party's image 805 is approached by the user's finger, the other party's image 805 may be enlarged and may thus be displayed on the entire display module 151, as shown in FIG. 29(a). On the other hand, if the user's image 803 is approached by the user's finger, the user's image 803 may be enlarged and may thus be displayed on the entire display module 151, as shown in FIG. 29(b).

The scale of enlargement of the user's image 803 or the other party's image 805 may be determined by the user. The user's image 803 or the other party's image 805 may be continually enlarged until no proximity signal is detected. If no proximity signal is detected, the user's image 803 or the other party's image 805 may be reduced back to its original size.

Figure 30:
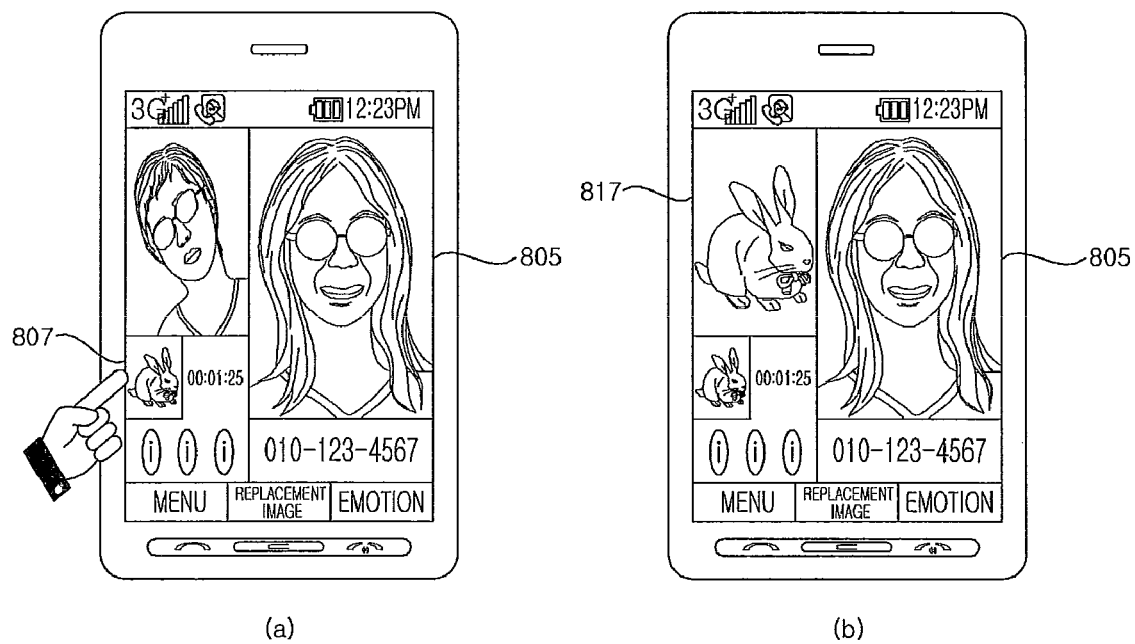

Referring to FIG. 30, if the replacement image 807 is approached by the user's finger, the replacement image 807, instead of the user's image 803, may be sent to the other party's mobile phone. In order to indicate that the replacement image 807 is being sent to the other party's mobile phone, an enlarged image 817 of the replacement image 807 may be displayed in an area where the user's image 803 is previously displayed.

If more than one replacement image is available, a menu for choosing one of the replacement images may be displayed. Then, if one of the replacement images is approached by the user's finger, an enlarged image of the approached replacement image may be displayed.

Figure 31:
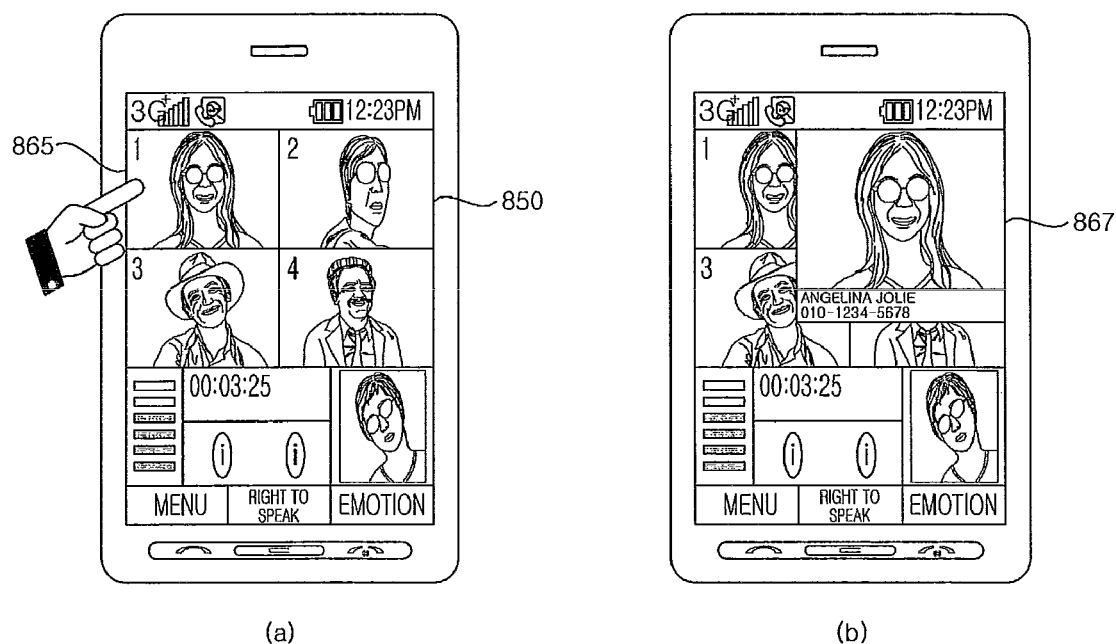

Referring to FIG. 31, during a video conference call, if an image 865 of one of the participants in the video conference call is approached, a window 867 including an enlarged image of the image 865 and the name and phone number of the corresponding video conference call participant may be displayed on a video conference call screen 865. In this manner, it is possible for the user to easily identify the other participants in the video conference call based on their enlarged images and information.

Figure 32:
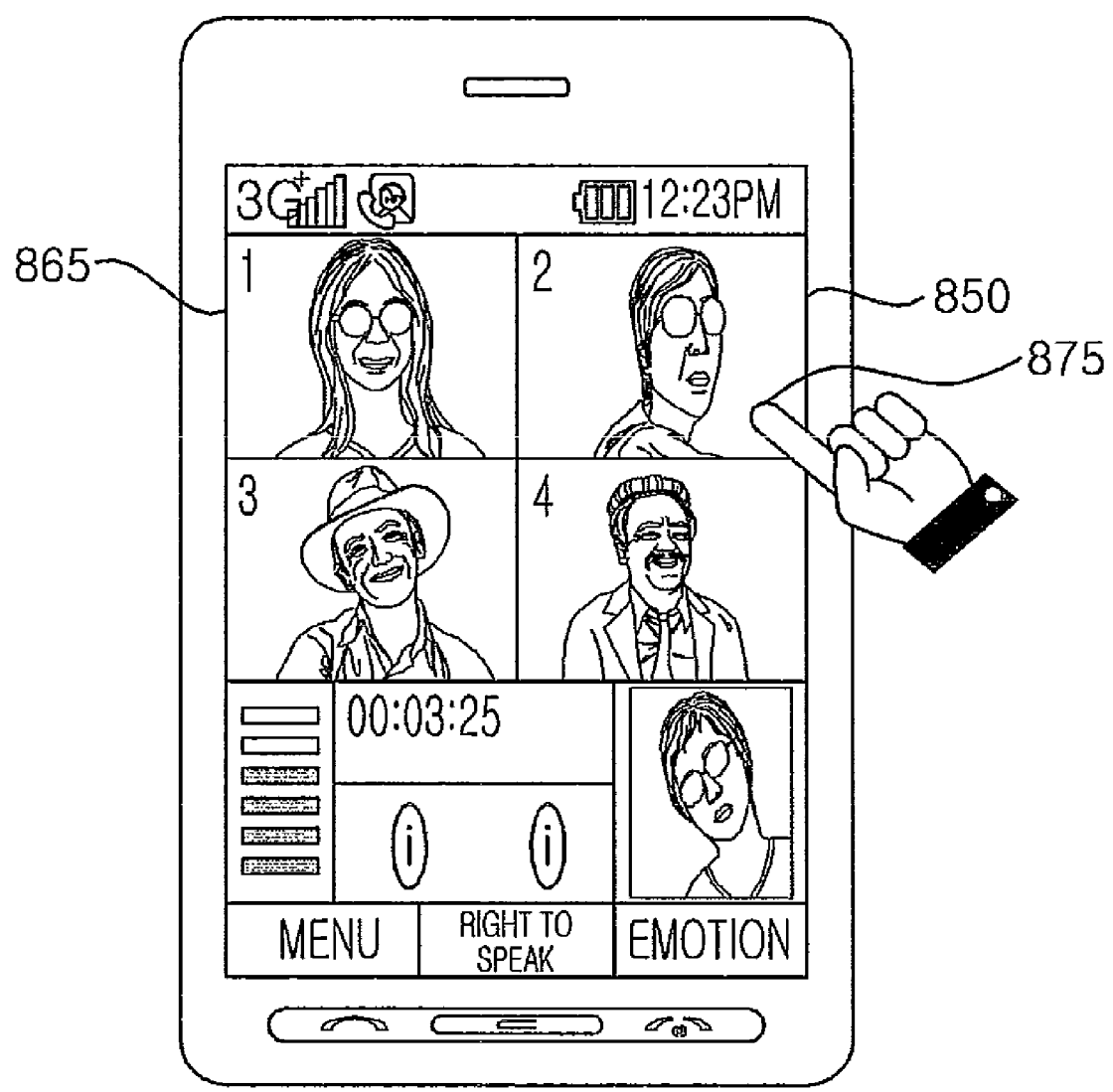

Referring to FIG. 32, during a video conference call, if an image 875 of one of the participants in the video conference call is approached by the user's finger, a right-to-speak mode may be set or cancelled for the corresponding video conference call participant in response to a proximity signal.

Figure 33:
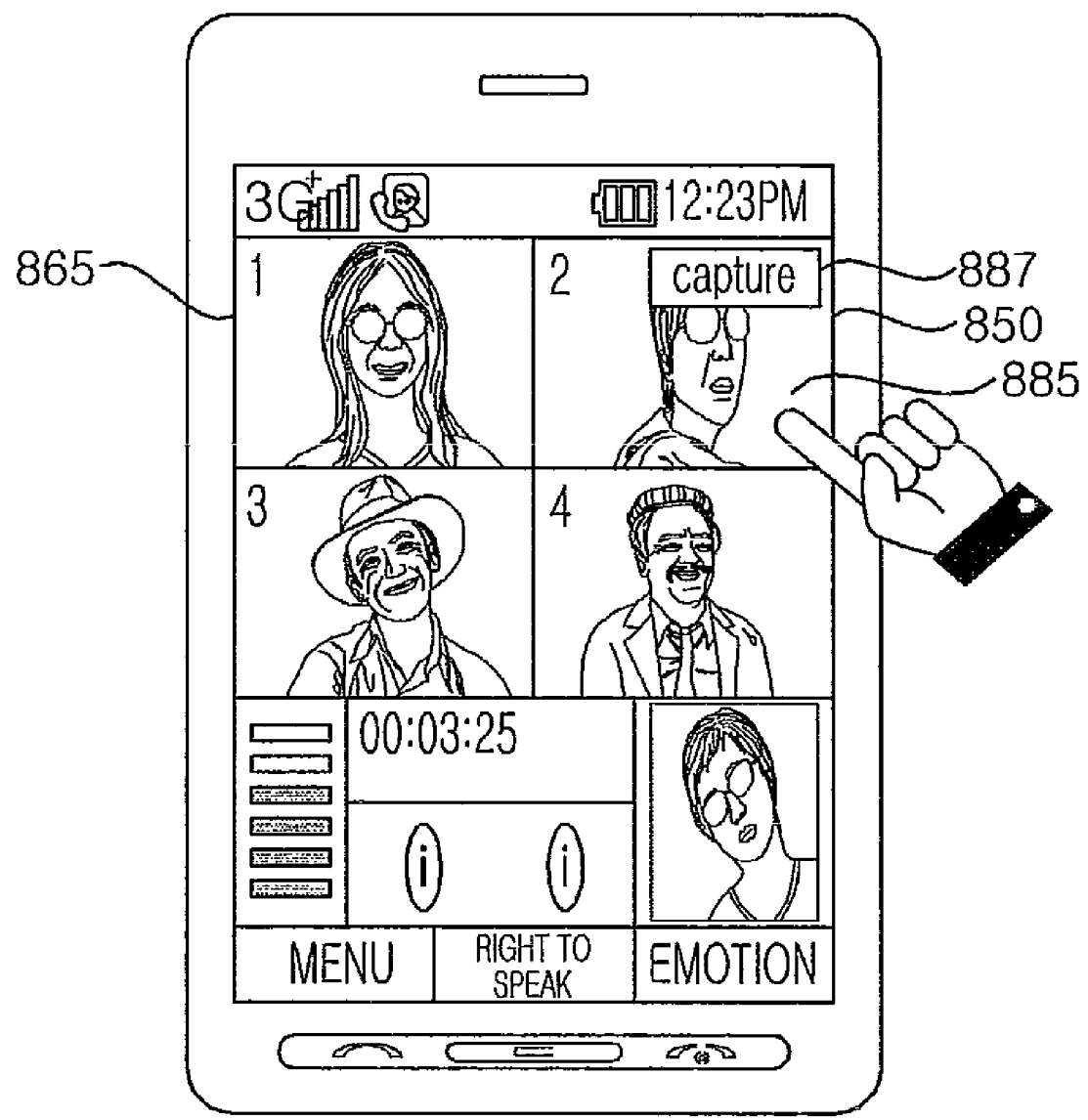

Referring to FIG. 33, during a video conference call, an image 885 of one of the participants in the video call conference may be captured or recorded in response to the user's finger approaching the display module 151. Thereafter, an icon 887 indicating that the image 885 is being captured may be displayed. In addition, the image 885 may be subjected to various screen control operations such as the adjustment of brightness and saturation in response to a proximity signal. Moreover, during a video call, various operations associated with the video call may be efficiently controlled in response to a proximity signal.

Figure 34:
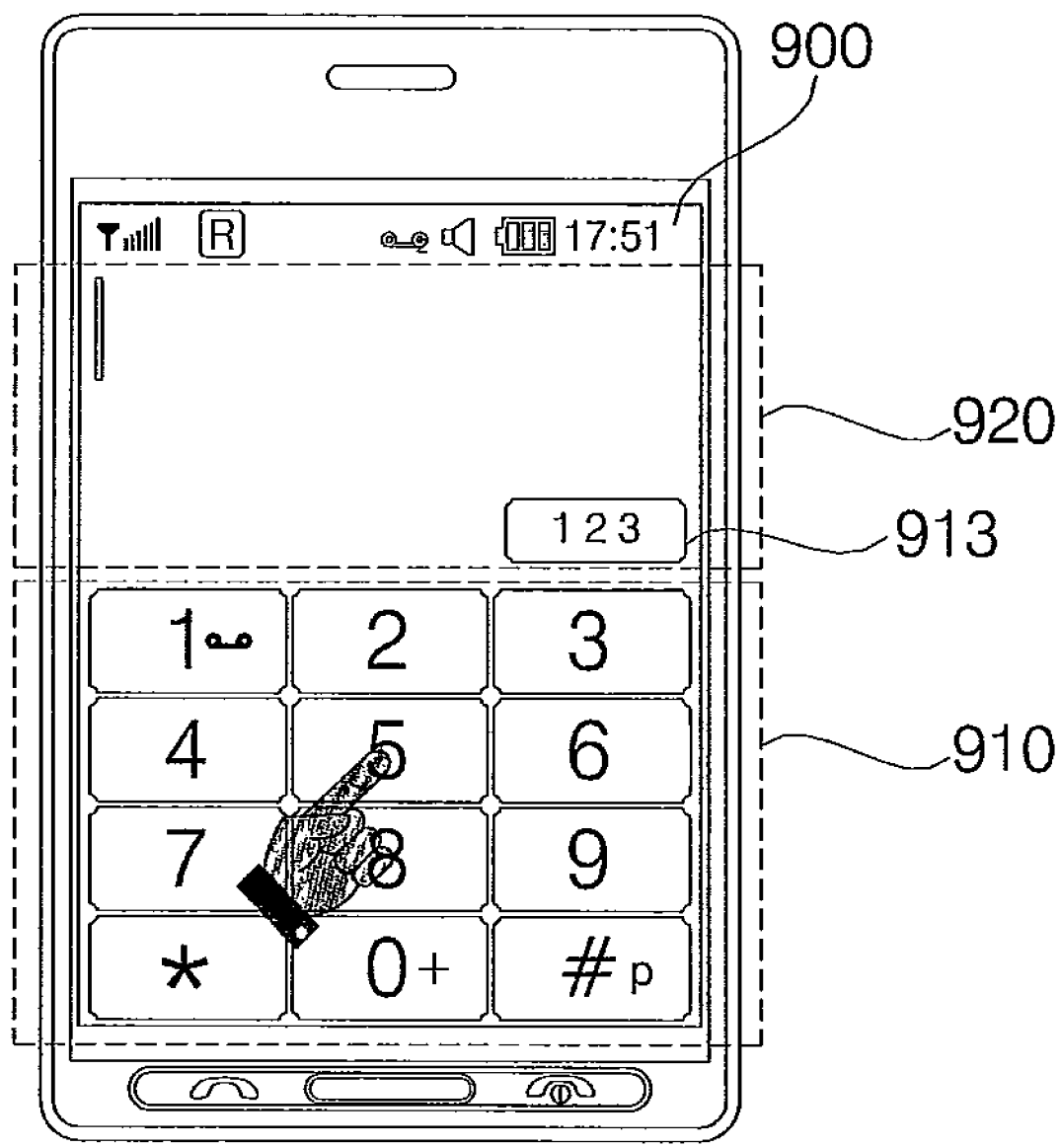
FIG. 34 illustrates a diagram of a screen on which a touch keypad input window is displayed.

FIG. 34 illustrates a diagram of a screen 900 on which a touch keypad input window 910 is displayed. Referring to FIG. 34, if a call mode is chosen, the touch keypad input window 910 for inputting numerals and a display window 920 for displaying numerals input to the touch keypad input window 910 may be displayed on the screen 900. A plurality of indicator icons indicating received signal intensity, remaining battery power, and current time information may be displayed at the top of the display window 920, and an icon 913 indicating that a current data-input mode is a numeral-input mode may be displayed in the display window 920.

If the touch keypad input window 910 is approached by the user's finger, a vibration signal corresponding to one of a plurality of touch keys of the touch keypad input window 910 approached by the user's finger may be output. If the user moves his or her finger from a touch key '0' to a touch key '9' within the close vicinity of the display module 151, a vibration signal corresponding to the touch key '9', which is different from a vibration signal corresponding to the touch key '0', may be output. The intensity, length and pattern of vibration may vary from one touch key to another touch key of the touch keypad input window 910. The combination of more than one type of vibration may be output for each of the touch keys of the touch keypad input window 910. Therefore, it is possible for the user to easily identify each of the touch keys of the touch keypad input window 910 based on vibration output by the mobile terminal 100 without the need to look at the touch keypad input window 910.

Figure 35:
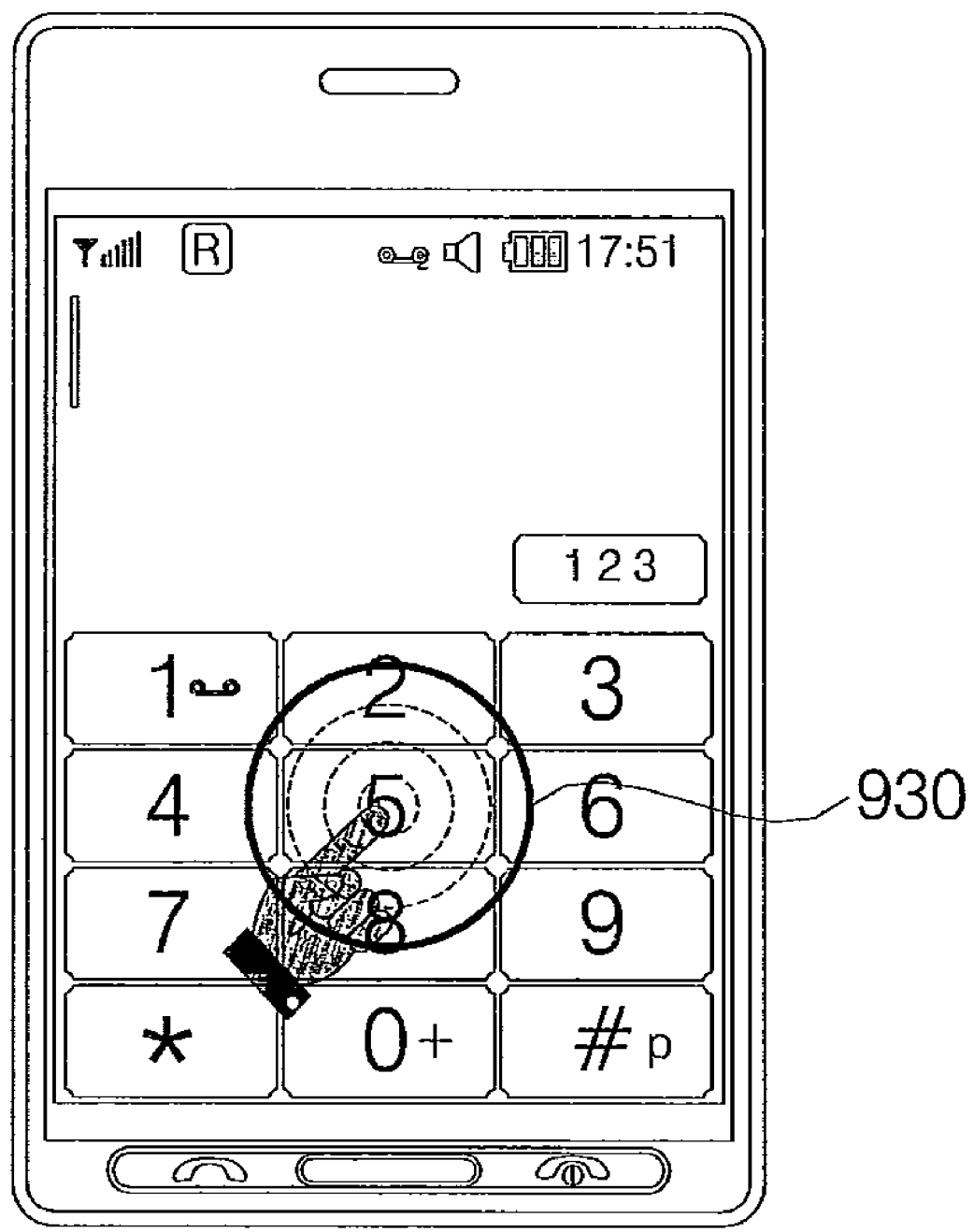
FIGS. 35 and 36 illustrate diagrams of various screens for explaining the method of the sixth exemplary embodiment.
Figure 36:
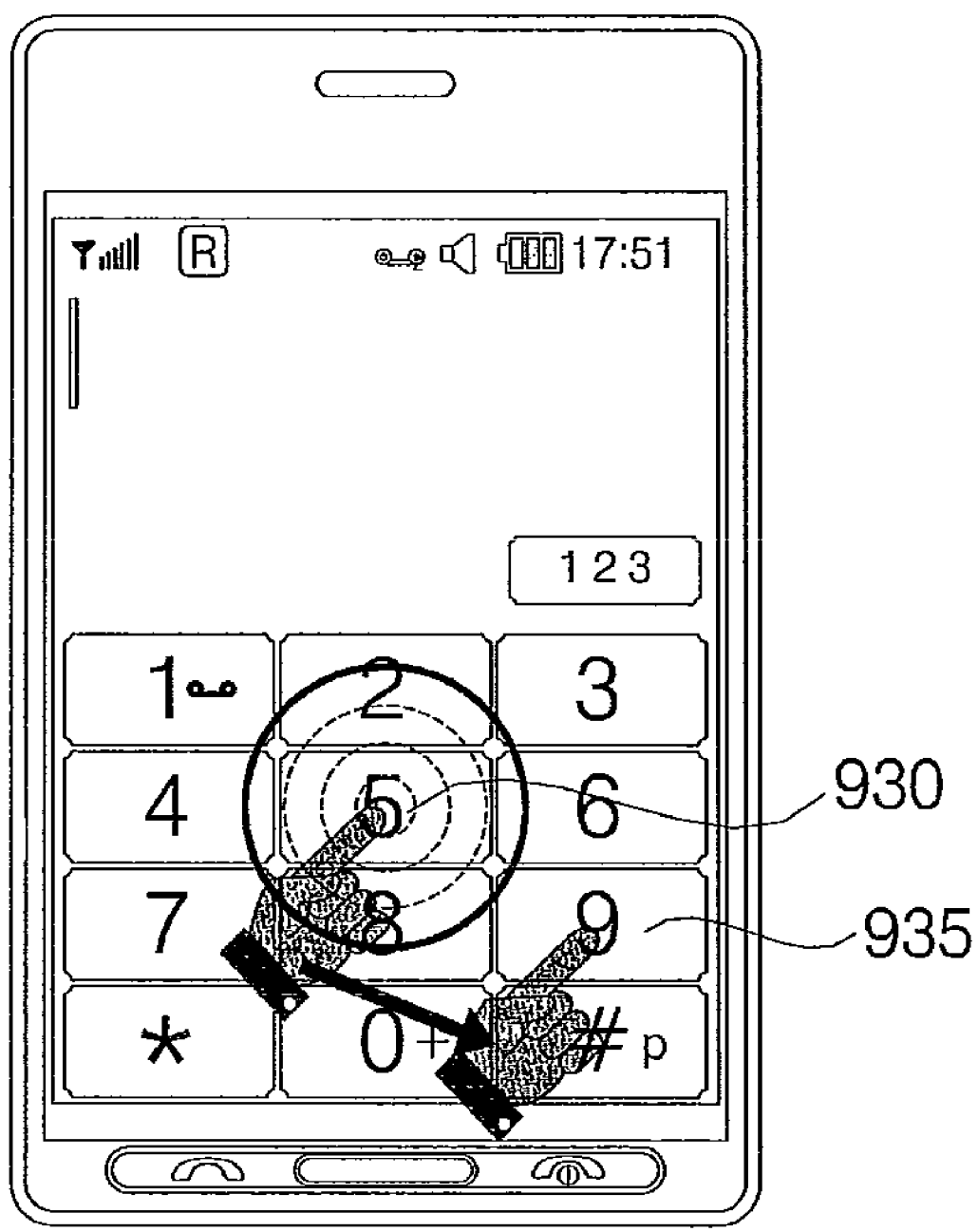

FIGS. 35 and 36 illustrate diagrams for explaining the method of the sixth exemplary embodiment. Referring to FIG. 35, a touch key '5' (930) may be set as a vibration area. Then, a vibration signal may be output when the touch key '5' (930) is approached by the user's finger. Therefore, the user may easily identify the touch key '5' (930) based on vibration output by the mobile terminal 100 and may thus easily identify other touch keys based on their relative positions to the touch key '5' (930). For example, if the user places his or her finger near the touch key '5' (930) and then touches a touch key '9' (935), the number '9' may be displayed in a display window.

In this manner, it is possible for the mobile terminal 100 to provide the functions of Braille-like protrusions formed on a typical keypad by using a vibration signal. The user may set any one of a plurality of touch keys of a touch keypad input window displayed on the display module 151 as a vibration area.

Figure 37:
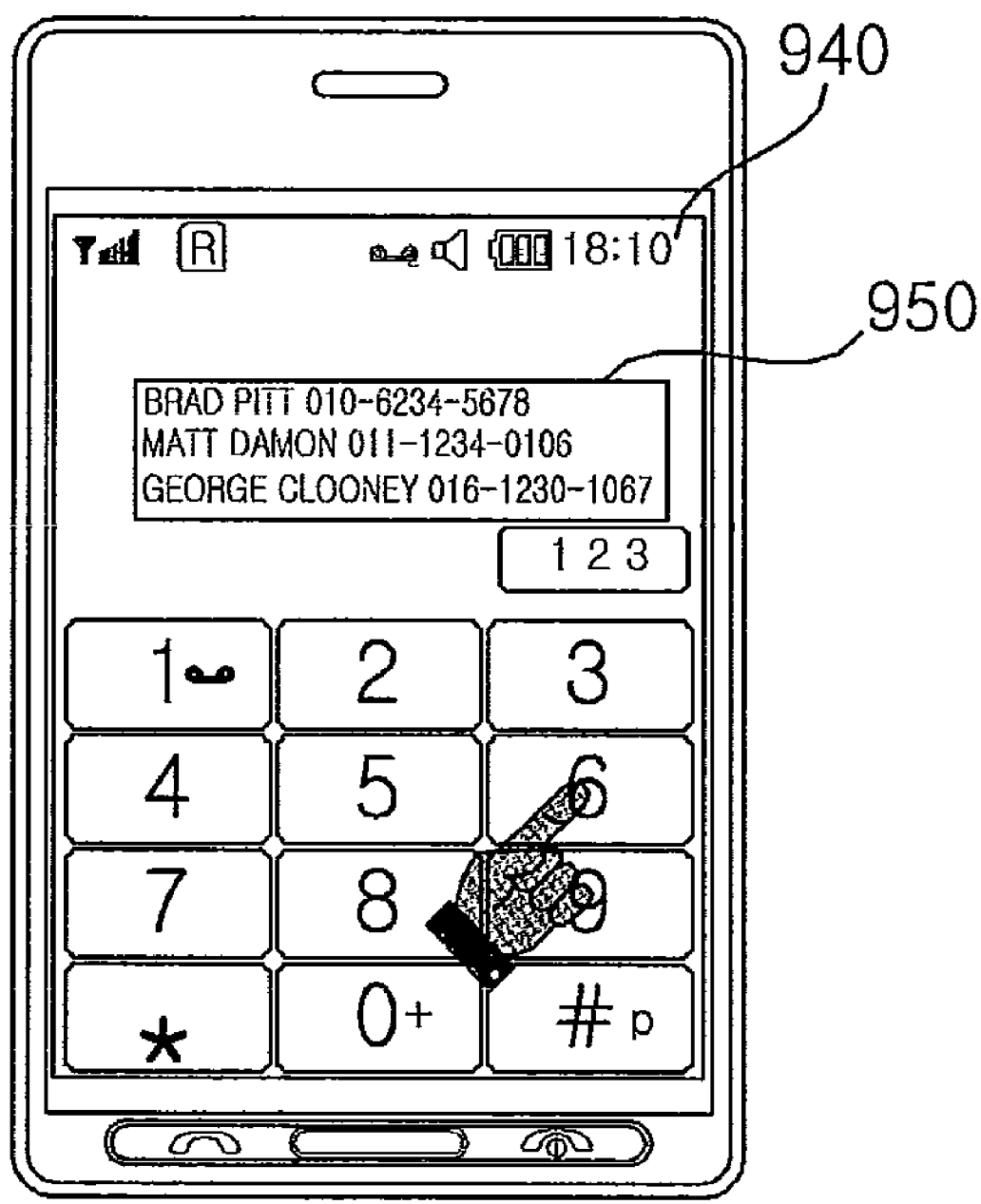
FIGS. 37 through 39 illustrate diagrams of various screens for explaining the method of the seventh exemplary embodiment.
Figure 38:
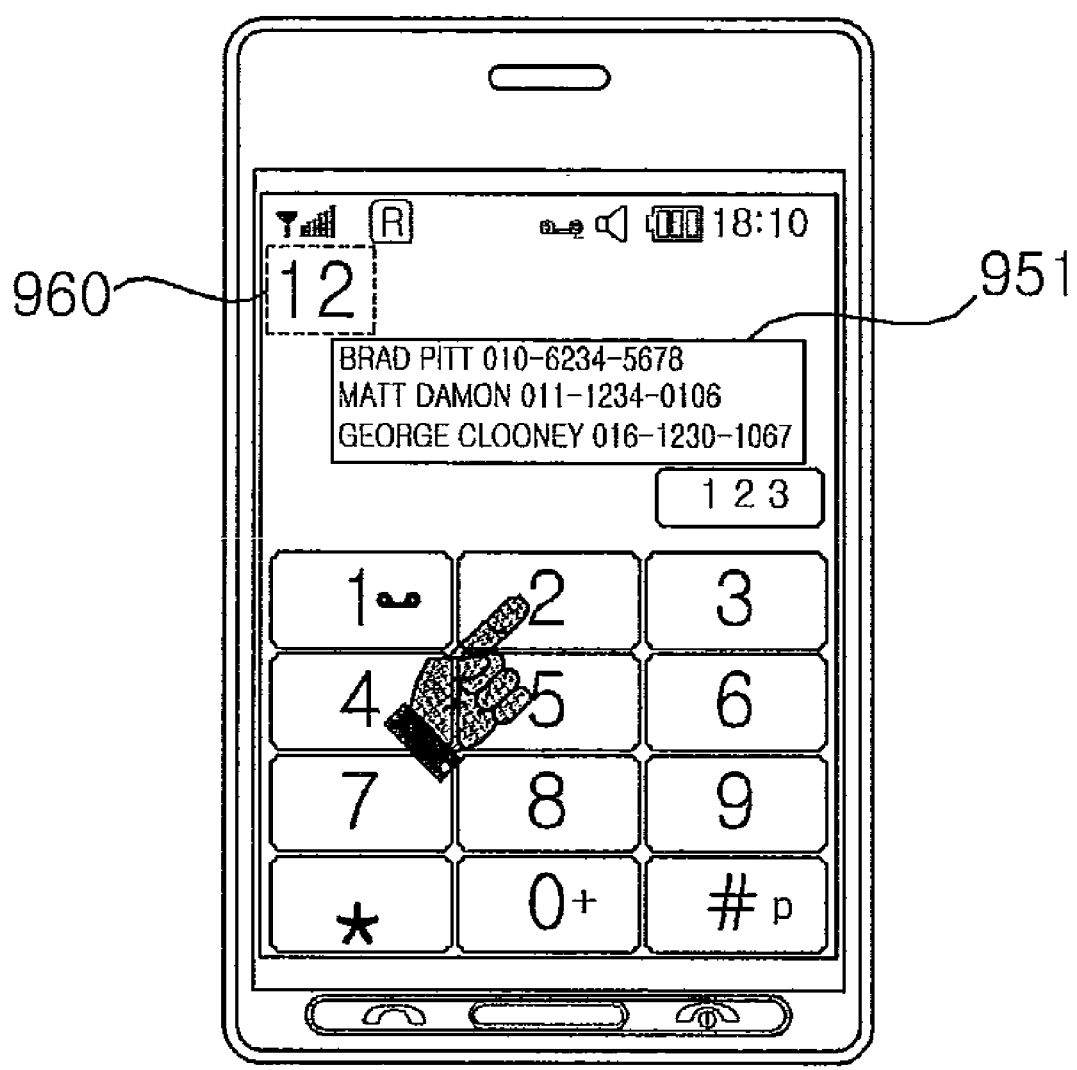
Figure 39:
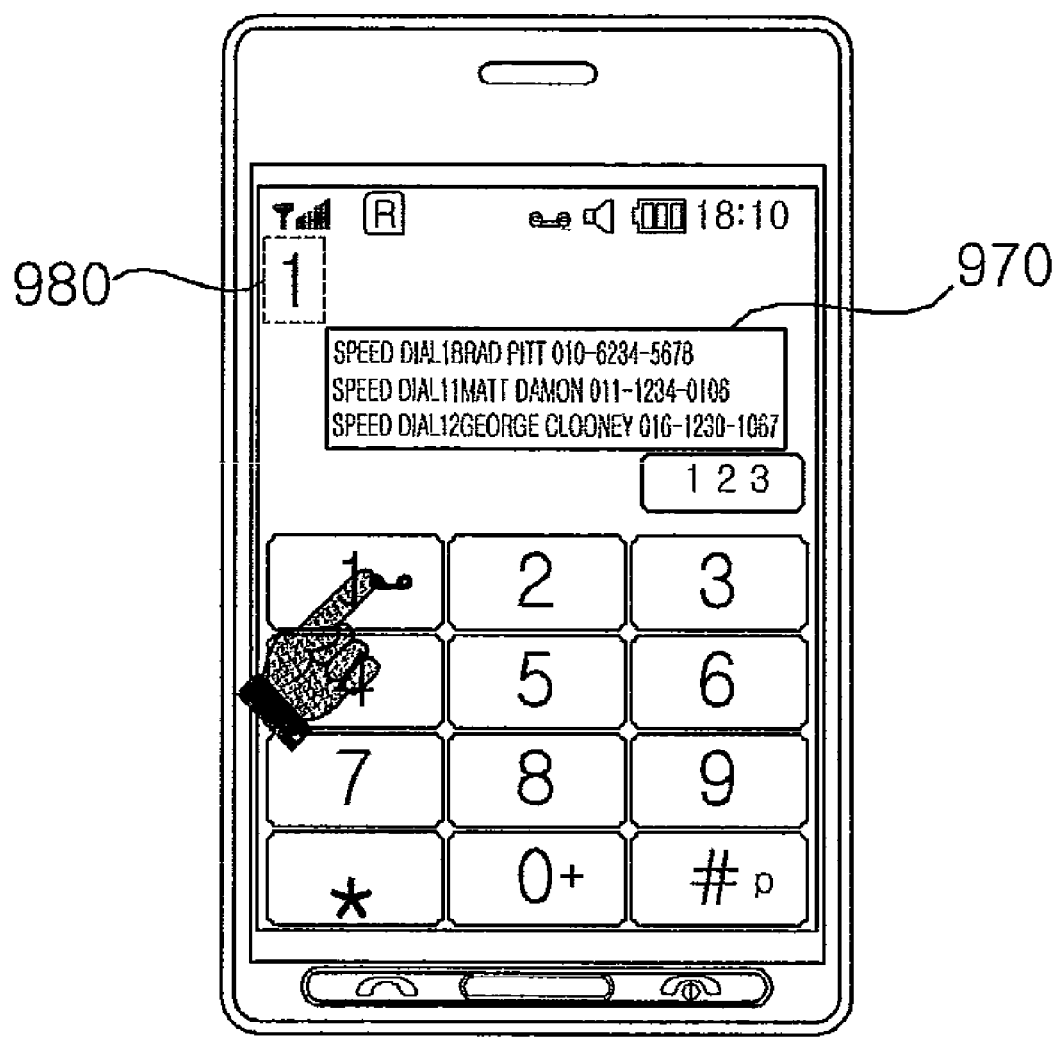

FIGS. 37 through 39 illustrate diagrams for explaining the method of the seventh exemplary embodiment. Referring to a screen 940 of FIG. 37, if a touch key '6' of a touch keypad input window is approached by the user's finger, a list 950 of candidate phone numbers including the number '6' may be displayed as a popup window. Then, the user may choose one of the candidate phone numbers and may make a call or send a message to the chosen candidate phone number.

Referring to FIG. 38, if a touch key '2' is approached by the user's finger when the numeral '1' is input, a list 621 of candidate phone numbers including the number string '12' may be displayed. In this case, an icon 960 indicating that the phone numbers included in the list 621 all include the number string '12' may be displayed.

Alternatively, referring to FIG. 39, if the touch key '1' is approached by the user's finger, a list 970 of speed dial numbers including the number '1' may be displayed. The user may determine in advance whether to display a list of candidate phone numbers or a list of speed dial numbers in response to a proximity signal.

The mobile terminal according to the present invention and the method of controlling the mobile terminal according to the present invention are not restricted to the exemplary embodiments set forth herein. Therefore, variations and combinations of the exemplary embodiments set forth herein may fall within the scope of the present invention.

The present invention can be realized as code that can be read by a processor (such as a mobile station modem (MSM)) included in a mobile terminal and that can be written on a computer-readable recording medium. The computer-readable recording medium may be any type of recording device in which data is stored in a computer-readable manner. Examples of the computer-readable recording medium include a ROM, a RAM, a CD-ROM, a magnetic tape, a floppy disc, an optical data storage, and a carrier wave (e.g., data transmission through the internet). The computer-readable recording medium can be distributed over a plurality of computer systems connected to a network so that computer-readable code is written thereto and executed therefrom in a decentralized manner. Functional programs, code, and code segments needed for realizing the present invention can be easily construed by one of ordinary skill in the art.

As described above, according to the present invention, it is possible to effectively control various image-editing operations performed on an image on a display module in response to a touch input and a proximity signal generated by a proximity sensor. In addition, it is possible to apply various screen effects to an image on a display module in response to a proximity signal. Therefore, it is possible to conveniently control the operation of a mobile terminal simply by placing a finger near a display module and touching the display module without the need to choose and execute a menu for controlling image editing.

According to the present invention, it is possible to output different vibration signals for different touch keys of a touch keypad input window whenever the touch keys are respectively approached by a user's finger. Therefore, it is possible for the user to easily identify each of the touch keys of the touch keypad input window based on vibration output by a mobile terminal. In addition, it is possible to display a list of candidate phone numbers in response to a proximity signal and to provide the functions of Braille-like protrusions formed on a typical keypad. Therefore, it is possible for the user to easily control the operation of a mobile terminal based on various vibration signals output by the mobile terminal by placing his or her finger near the touch keypad input window and touching the touch keypad input window.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A method of controlling a mobile terminal including a touch screen and a proximity sensor, the method comprising:
    displaying an image on the touch screen;
    if a first touch signal for the image is received, displaying an image-editing menu, the image-editing menu comprising an editing function selection menu and a color selection menu;
    if a second touch signal for an area of the touch screen on which the image-editing menu is not displayed is received, making the image-editing menu disappear from the touch screen;
    choosing an editing function of a plurality of editing functions from the editing function selection menu in response to a user input;
    displaying a detail selection menu for selecting a detail setting function of the chosen editing function upon choosing the editing function, the detail setting function comprising at least one of a style, a shape, a size and a thickness of an item corresponding to the chosen editing function;

selecting the detail setting function of the chosen editing function from the detail selection menu according to a proximity signal corresponding to a degree of proximity between an object and the touch screen; and performing the chosen editing function on the image according to a horizontal movement of a proximity position of the object, wherein the chosen editing function is performed using the detail setting function selected from the detail selection menu and a color selected from the color selection menu.

2. The method of claim 1, further comprising:
displaying an edited image obtained by performing the chosen editing function on the image.

3. The method of claim 1, wherein the chosen editing function is one of a drawing function, a painting function, an auxiliary function and a 'selection' function.

4. The method of claim 1, wherein the chosen editing function is performed by using the detail setting function differently according to the degree of proximity when the degree of proximity between the object and the touch screen is varied during the horizontal movement of the object.

5. The method of claim 1, wherein, if the chosen editing function is a line drawing function, the performing of the chosen editing function comprises:
selecting a line style according to the degree of proximity, and
drawing a line on the image according to the horizontal movement of the proximity position.

6. The method of claim 1, wherein, if the chosen editing function is an 'erasure' function, the performing of the chosen editing function comprises:
selecting an erasure size according to the degree of proximity, and
erasing the image by moving an erasure with the selected erasure size according to the horizontal movement of the proximity position.

7. The method of claim 1, wherein, if the chosen editing function is a 'paintbrush' function, the performing of the chosen editing function comprises:
selecting a paintbrush size according to the degree of proximity, and
painting over the image by moving a paintbrush with the selected paintbrush size according to the horizontal movement of the proximity position.

8. The method of claim 1, wherein, if the chosen editing function is a 'spray' function, the performing of the chosen editing function comprises:
selecting a spray brush size according to the degree of proximity, and
painting over the image by moving a spray brush with the selected spray brush size according to the horizontal movement of the proximity position.

9. The method of claim 1, wherein, if the chosen editing function is a 'selection' function, the performing of the chosen editing function comprises:

selecting a selection size according to the degree of proximity, and
selecting part of the image with the selected selection size according to the horizontal movement of the proximity position.

10. The method of claim 1, further comprising:
displaying an icon indicating at least one of the degree of proximity and the proximity position on the touch screen.

11. The method of claim 1, further comprising:
displaying an icon indicating a part of the image currently being edited.

12. The method of claim 1, further comprising:
if the proximity signal is not detected for more than a predetermined amount of time, making the image-editing menu disappear from the touch screen.

13. The method of claim 1, further comprising:
saving the edited image.

14. The method of claim 13, further comprising:
displaying a message indicating that the edited image is saved.

15. A mobile terminal comprising:
a touch screen configured to display an image;
a proximity sensor configured to output a proximity signal indicating a degree of proximity of an object detected to be nearby and approaching the touch screen and a proximity position of the object; and
a controller configured to
enable to display an image-editing menu on the touch screen if a first touch signal for an area of the image is detected, the image-editing menu comprising an editing function selection menu and a color selection menu,
control the image-editing menu to disappear from the touch screen if a second touch signal for an area of the touch screen on which the image-editing menu is not displayed is detected,
choose an editing function of a plurality of editing functions from the editing function selection menu in response to a user input,
enable to display a detail selection menu for selecting a detail setting function of the chosen editing function upon choosing the editing function, the detail setting function comprising at least one of a style, a shape, a size and a thickness of an item corresponding to the chosen editing function,
select the detail setting function of the chosen editing function from the detail selection menu according to a degree of proximity between the object and the touch screen, and
perform the chosen editing function on the image according to a horizontal movement of a proximity position of the object,
wherein the chosen editing function is performed using the detail setting function selected from the detail selection menu and a color selected from the color selection menu.

* * * * *